United States Patent
van Antwerpen

(10) Patent No.: US 10,748,333 B2
(45) Date of Patent: Aug. 18, 2020

(54) FINITE APERTURE OMNI-DIRECTIONAL STEREO LIGHT TRANSPORT

(71) Applicant: NVIDIA Corporation, Santa Clara, CA (US)

(72) Inventor: Dietger van Antwerpen, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 15/881,554

(22) Filed: Jan. 26, 2018

(65) Prior Publication Data

US 2018/0276879 A1    Sep. 27, 2018

Related U.S. Application Data

(60) Provisional application No. 62/475,740, filed on Mar. 23, 2017, provisional application No. 62/518,579, filed on Jun. 12, 2017.

(51) Int. Cl.
| | |
|---|---|
| *G06T 15/00* | (2011.01) |
| *G06T 15/80* | (2011.01) |
| *H04N 13/275* | (2018.01) |
| *G06T 15/06* | (2011.01) |

(52) U.S. Cl.
CPC .............. *G06T 15/80* (2013.01); *G06T 15/06* (2013.01); *H04N 13/275* (2018.05)

(58) Field of Classification Search
CPC ........ G06T 15/06; G06T 15/80; H04N 13/275
USPC .......................................................... 345/418
See application file for complete search history.

(56) References Cited

U.S. PATENT DOCUMENTS

| | | | | |
|---|---|---|---|---|
| 7,952,606 B2 * | 5/2011 | Kweon | ................... | G03B 35/08 |
| | | | | 348/36 |
| 8,548,269 B2 * | 10/2013 | Zargarpour | ............ | G03B 35/08 |
| | | | | 382/284 |
| 9,244,258 B2 * | 1/2016 | Nishimura | ............. | G02B 13/06 |
| 9,791,700 B2 | 10/2017 | Schowengerdt | | |
| 9,877,016 B2 * | 1/2018 | Esteban | ............ | G02B 27/0172 |
| 9,888,228 B1 * | 2/2018 | Lacaze | ............... | G02B 17/0836 |

(Continued)

OTHER PUBLICATIONS

Lin, Shih-Schön, and Ruzena Bajcsy. "The true single view point (svp) configuration for omni-directional view catadioptric system using cone mirror." system (mirrors) 7 (2001): 1.*

(Continued)

*Primary Examiner* — Phu K Nguyen
(74) *Attorney, Agent, or Firm* — Shook, Hardy & Bacon, L.L.P.

(57) ABSTRACT

In various embodiments, a finite aperture omni-directional camera is modeled by aligning a finite aperture lens and focal point with the omni-directional part of the projection. For example, each point on an image plane maps to a direction in camera space. For a spherical projection, the lens can be orientated along this direction and the focal point is picked along this direction at focal distance from the lens. For a cylindrical projection, the lens can be oriented along the projected direction on the two dimensional (2D) xz-plane, as the projection is not omni-directional in the y direction. The focal point is picked along the (unprojected) direction so its projection on the xz-plane is at focal distance from the lens. The final outgoing ray can be constructed by sampling of point on this oriented lens and shooting a ray from there through the focal point.

20 Claims, 26 Drawing Sheets

(56) References Cited

U.S. PATENT DOCUMENTS

| | | | |
|---|---|---|---|
| 9,915,824 B2 | 3/2018 | Schowengerdt et al. | |
| 10,200,675 B1* | 2/2019 | Lacaze | G02B 17/0836 |
| 2015/0235471 A1 | 8/2015 | Schowengerdt | |

OTHER PUBLICATIONS

Marino F, De Ruvo P, De Ruvo G, Nitti M, Stella E. HiPER 3-D: An omnidirectional sensor for high precision environmental 3-D reconstruction. IEEE Transactions on Industrial Electronics. Jan. 2012;59(1):579-91.*

Lei J, Du X, Zhu YF, Liu JL. Unwrapping and stereo rectification for omnidirectional images. Journal of Zhejiang University-Science A. Aug. 1, 2009;10(8):1125-39.*

Nagy, Aliz-Eva, Istvan Szakats, Tiberiu Marita, and Sergiu Nedevschi. "Development of an omnidirectional stereo vision system." In 2013 IEEE 9th International Conference on Intelligent Computer Communication and Processing (ICCP), pp. 235-242. IEEE, 2013.*

Jensen, H.W., Arvo, J., Dutre, P., Keller, A., Owen, A., Pharr, M. and Shirley, P., 2003. Monte Carlo ray tracing. In ACM SIGGRAPH (vol. 5).*

Cline D, Talbot J, Egbert P. Energy redistribution path tracing. InACM Transactions on Graphics (TOG) Jul. 31, 2005 (vol. 24, No. 3, pp. 1186-1195). ACM.*

Barsky BA, Horn DR, Klein SA, Pang JA, Yu M. Camera models and optical systems used in computer graphics: part I, object-based techniques. In International conference on computational science and its applications May 18, 2003 (pp. 246-255). Springer, Berlin, Heidelberg.*

Kravtchenko, V. (1999). Tracking color objects in real time (Doctoral dissertation, University of British Columbia).*

"Rendering Omni-directional Stereo Content", Google Inc., 11 pages. https://developers.google.com/cardboard/jump/rendering-ods-content.pdf.

* cited by examiner

FINITE APERTURE OMNI-DIRECTIONAL STEREO LIGHT TRANSPORT

CROSS REFERENCE TO RELATED APPLICATIONS

This application claims the benefit of U.S. Provisional Patent Application No. 62/475,740 entitled "A Method for Finite Aperture Omni-Directional Stereo Light Transport", by Dietger van Antwerpen, filed Mar. 23, 2017, which is hereby incorporated by reference.

This application claims the benefit of U.S. Provisional Patent Application No. 62/518,579 entitled "Finite Aperture Omni-Directional Stereo Light Transport", by Dietger van Antwerpen, filed Jun. 12, 2017, which is hereby incorporated by reference.

BACKGROUND

Omni-directional virtual reality (VR) applications such as used by youtube's 360 video format require omni-directional stereo rendering. However, one disadvantage associated with conventional omni-directional stereo rendering is that it lacks depth of field effects where certain things are in focus and certain things are out of focus depending on how far they are from the focal distance. It is pointed out that depth of field effects can be another important depth cue besides stereo vision.

SUMMARY

Various embodiments in accordance with the present disclosure can at least address the disadvantage described above that is associated with conventional omni-directional stereo rendering.

In various embodiments, a finite aperture omni-directional camera is modeled by aligning a finite aperture lens and focal point with the omni-directional part of the projection. For example, each point on an image plane maps to a direction in camera space. For a spherical projection, the lens can be orientated along this direction and the focal point is picked along this direction at focal distance from the lens. For a cylindrical projection, the lens can be oriented along the projected direction on the two dimensional (2D) xz-plane, as the projection is not omni-directional in the y direction. The focal point is picked along the (unprojected) direction so its projection on the xz-plane is at focal distance from the lens. The final outgoing ray can be constructed by sampling of point on this oriented lens and shooting a ray from there through the focal point.

In various embodiments, the above described finite aperture lens model can be combined with the stereo omni-directional rendering process. Therefore, in various embodiments, this Finite Aperture Omni-directional Stereo Camera can be then used in light transport rendering algorithms to render photorealistic omni-directional stereo images. Light transport rendering algorithms such as bidirectional path tracing and photon mapping involve mapping points on an image plane to primary rays in camera space in the inverse of mapping scene points back to image plane coordinates. For a given stereo separation distance, finite aperture lens coordinates and image plane point, the method described above gives the outgoing camera ray. Note that various embodiments can involve an inverse method of mapping one or more camera space scene points back to image coordinates for fixed stereo separation distance and finite aperture lens coordinates.

In various embodiments, the present disclosure can include a method of generating an image. The method can include accessing a first data model of an environment captured by a virtual reality camera system, the data model representing an image backplate. In addition, the method can include accessing a second data model of objects within a virtualized three dimensional (3D) space, wherein the image backplate is within the space. The method can also include simulating a presence of at least one light source, or camera, within the space and casting a ray from the light source, or the camera into the space, to a point, p, in the space, possibly after interacting with objects in the second data model, using ray tracing techniques. Furthermore, the method can include simulating a finite aperture with respect to a camera capturing a two dimensional (2D) projection of a 3D scene by projecting a ray from the point p, through a focal point of the camera, to a lens point l within the finite aperture of the camera. The method can also include, provided the point p lies within the backplate and is not occluded from a camera performing the following: based on the point p, performing inverse mapping to obtain a orientation in camera space corresponding to the point p and the lens point l, wherein the orientation is defined by two values; based on the orientation, performing inverse mapping to obtain a pixel, s, on a capture plane of the camera corresponding to the point p and the lens point l; and using the pixel s, looking up a color value within the first data model corresponding to pixel s, and using this color value to compute a ray tracing value at the point p. Additionally, the method can include, provided the point p lies within an object of the objects and is not occluded from a camera, performing the following: based on the point p, performing inverse mapping to obtain a orientation in camera space corresponding to the point p and the lens point l, wherein the orientation is defined by two values; based on the orientation, performing inverse mapping to obtain a pixel, s, on a capture plane of the camera corresponding to the point p and the lens point l; and at the pixel s of the capture plane, rendering energy contribution from the point p.

In various embodiments, the present disclosure can include a method of generating an image. The method can include a) accessing a first data model of an environment captured by a virtual reality camera system, the data model representing an image backplate. Furthermore, the method can include b) accessing a second data model of objects within a virtualized three dimensional (3D) space, wherein the image backplate is within the space. Moreover, the method can include c) provided a given pixel, s, perform a mapping to a camera orientation, wherein the orientation is defined by two values. Additionally, the method can include d) provided a lens point, l, generating a camera ray through a focal point f, of the oriented camera. In addition, the method can include e) computing incoming energy along the ray using ray tracing techniques. The method can also include f) rendering energy contribution at the pixel s of a capture plane. The method can also include g) repeating the c)-f) for a second lens position l for each pixel s.

In various embodiments, the present disclosure can include a computer system including a processor and a memory coupled to the processor. The memory includes instructions for implementing a method of generating an image. The memory includes accessing a first data model of an environment captured by a virtual reality camera system, the data model representing an image backplate. Moreover, the method can include accessing a second data model of objects within a virtualized three dimensional (3D) space, wherein the image backplate is within the space. Additionally, the method can include simulating a presence of at least one light source, or camera, within the space and casting a ray from the light source, or the camera into the space, to a point, p, in the space, possibly after interacting with objects in the second data model, using ray tracing techniques. The method can also include simulating a finite aperture with respect to a camera capturing a 2D projection of a 3D scene by projecting a ray from the point p, through a focal point of the camera, to a lens point l within the finite aperture of the camera. Furthermore, the method can include, provided the point p lies within the backplate and is not occluded from a camera performing the following: based on the point p, performing inverse mapping to obtain a orientation in camera space corresponding to the point p and the lens point l, wherein the orientation is defined by two values; based on the orientation, performing inverse mapping to obtain a pixel, s, on a capture plane of the camera corresponding to the point p and the lens point l; and using the pixel s, looking up a color value within the first data model corresponding to pixel s, and using this color value to compute a ray tracing value at the point p. In addition, the method can include provided the point p lies within an object of the objects and is not occluded from a camera, performing the following: based on the point p, performing inverse mapping to obtain a orientation in camera space corresponding to the point p and the lens point l, wherein the orientation is defined by two values; based on the orientation, performing inverse mapping to obtain a pixel, s, on a capture plane of the camera corresponding to the point p and the lens point l; and at the pixel s of the capture plane, rendering energy contribution from the point p.

In various embodiments, the present disclosure can include a method of generating an image. The method can include accessing a first data model of an environment captured by a virtual reality camera system, the data model representing an image backplate. In addition, the method can include accessing a second data model of objects within a virtualized three dimensional (3D) space, wherein the image backplate is within the space. The method can also include simulating a presence of at least one light source, or camera, within the space and casting a ray from the light source, or the camera into the space, to a point, p, in the space, possibly after interacting with objects in the second data model, using ray tracing techniques. Furthermore, the method can include simulating a finite aperture with respect to a camera capturing a two dimensional (2D) projection of a 3D scene by projecting a ray from the point p, through a focal point of the camera, to a lens point l within the finite aperture of the camera. The method can also include, provided the point p lies within the backplate and is not occluded from a camera performing the following: based on the point p, performing inverse mapping to obtain a orientation in camera space corresponding to the point p and the lens point l, wherein the orientation is defined by two values; based on the orientation, performing inverse mapping to obtain a pixel, s, on a capture plane of the camera corresponding to the point p and the lens point l; and using the pixel s, looking up a color value within the first data model corresponding to pixel s, and using this color value to compute a ray tracing value at the point p. Additionally, the method can include, provided the point p lies within an object of the objects and is not occluded from a camera, performing the following: based on the point p, performing inverse mapping to obtain a orientation in camera space corresponding to the point p and the lens point l, wherein the orientation is defined by two values; based on the orientation, performing inverse mapping to obtain a pixel, s, on a capture plane of the camera corresponding to the point p and the lens point l; scale the energy contribution from the point p by a factor w; and at the pixel s of the capture plane, rendering the scaled energy contribution. In various embodiments, it is noted that the scaling factor w can be computed using Multiple Importance Sampling (MIS) techniques, but is not limited to such.

In various embodiments, the present disclosure can include a method of generating an image. The method can include a) accessing a first data model of an environment captured by a virtual reality camera system, the data model representing an image backplate. Furthermore, the method can include b) accessing a second data model of objects within a virtualized three dimensional (3D) space, wherein the image backplate is within the space. Moreover, the method can include c) provided a given pixel, s, perform a mapping to a camera orientation, wherein the orientation is defined by two values. Additionally, the method can include d) provided a lens point, l, generating a camera ray through a focal point f, of the oriented camera. In addition, the method can include e) scale the incoming energy contribution from the point p by a factor w. The method can also include f) rendering the scaled energy contribution at the pixel s of a capture plane. The method can also include g) repeating the c)-f) for a second lens position l for each pixel s. In various embodiments, note that the scaling factor w can be computed using Multiple Importance Sampling (MIS) techniques, but is not limited to such.

In various embodiments, it is noted that the methods described in the above two paragraphs can be combined into a method. Each method would render to the same capture plane but scale the energy that is rendered to the capture plane by factors computed using Multiple Importance Sampling. Note that each method of the above two paragraphs would run independently. They just share the same scene data and capture plane. Therefore, the first data model, the second data model, and the capture plane are shared by the two methods of the above two paragraphs.

While particular embodiments in accordance with the present disclosure have been specifically described within this Summary, it is noted that the present disclosure and the claimed subject matter are not limited in any way by these embodiments.

BRIEF DESCRIPTION OF THE DRAWINGS

Within the accompanying drawings, various embodiments in accordance with the present disclosure are illustrated by way of example and not by way of limitation. It is noted that like reference numerals denote similar elements throughout the drawings.

DETAILED DESCRIPTION

Figure 1:
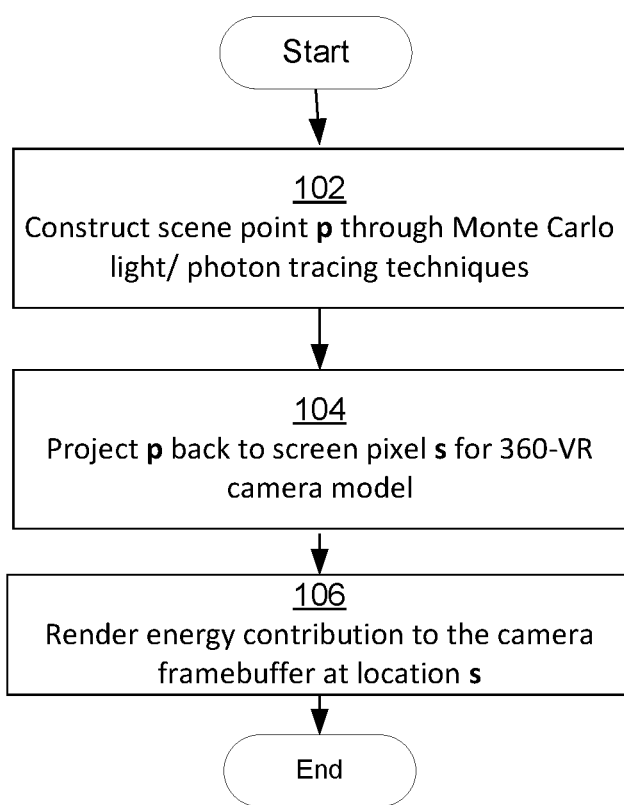
FIG. 1 is a flow diagram of a method for rendering an image in accordance with various embodiments of the present disclosure.

Reference will now be made in detail to various embodiments in accordance with the present disclosure, examples of which are illustrated in the accompanying drawings. While the present disclosure will be described in conjunction with various embodiments, it will be understood that these various embodiments are not intended to limit the present disclosure. On the contrary, the present disclosure is intended to cover alternatives, modifications and equivalents, which may be included within the scope of the present disclosure as construed according to the Claims. Furthermore, in the following detailed description of various embodiments in accordance with the present disclosure, numerous specific details are set forth in order to provide a thorough understanding of the present disclosure. However, it will be evident to one of ordinary skill in the art that the present disclosure may be practiced without these specific details or with equivalents thereof. In other instances, well known methods, procedures, components, and circuits have not been described in detail as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "simulating," "casting," "projecting," "performing," "computing," "mapping," "looking up," "using," "projecting," "rendering," "determining," "implementing," "inputting," "operating," "analyzing," "identifying," "generating," "extracting," "receiving," "processing," "acquiring," "producing," "providing," "storing," "altering," "creating," "loading" or the like, refer to actions and processes of a computing system or similar electronic computing device or processor. The computing system or similar electronic computing device manipulates and transforms data represented as physical (electronic) quantities within the computing system memories, registers or other such information storage, transmission or display devices.

Portions of the detailed description that follow may be presented and discussed in terms of one or more methods. Although steps and sequencing thereof are disclosed in figures herein describing the operations of one or more methods, such steps and sequencing are exemplary. Any method is well suited to performing various other steps or variations of the steps recited in the flowchart of the figure herein, and in a sequence other than that depicted and described herein.

Various embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Finite Aperture Omni-Directional Camera

Current approaches to omni-directional rendering use a pinhole camera model. In various embodiments in accordance with the present disclosure, this model is extended to support finite aperture, allowing for depth of field rendering. For example, in various embodiments, a finite aperture omni-directional camera is modeled by aligning the finite aperture lens and focal point with the omni-directional part of the projection. Each point on the image plane maps to a direction in camera space. For a spherical projection, the lens is orientated along this direction and the focal point is picked along this direction at focal distance. For a cylindrical projection, the lens is oriented along the projected direction on the two dimensional (2D) xz-plane, as the projection is not omni-directional in the y direction. The focal point is picked along the (unprojected) direction so its projection on the xz-plane is at focal distance from the lens. The final outgoing ray is constructed by sampling of a point on this oriented lens and shooting a ray from there through the focal point.

Finite Aperture Omni-Directional Stereo Light Transport

In various embodiments, the above described finite aperture lens model is combined with the stereo omni-directional rendering process. In various embodiments, this new Finite Aperture Omni-directional Stereo Camera is then used in light transport rendering algorithms to render photorealistic Omni-directional Stereo images. Light transport rendering algorithms such as bidirectional path tracing and photon mapping involve mapping points on the image plane to primary rays in camera space and the inverse of mapping scene points back to image plane coordinates. For a given stereo separation distance, finite aperture lens coordinates and image plane point, the method described above gives the outgoing camera ray. Note that described herein in accordance with various embodiments is an inverse method of mapping a camera space scene points back to image coordinates for fixed stereo separation distance and finite aperture lens coordinates.

Spherical Camera

In various embodiments, each image coordinate maps to spherical coordinates (theta, phi). For given lens coordinates, each spherical coordinate maps to a single camera ray. All rays for a fixed theta together form a hyperboloid. The theta is searched for which rotates the hyperboloid so it contains a scene point, which corresponds to rotating the scene point in the opposite orientation until it lies on the hyperbola. The intersection is searched for of the hyperboloid with the 2D circle in the xz-plane through the scene point. This circle lies on the sphere around the origin containing the scene point. Intersecting this sphere with the hyperboloid will give a circle in the yz-plane with its center on the x-axis. The radius is found in the x coordinate of this circle by solving the hyperboloid-sphere intersection in the y=0 plane. The intersection between the hyperboloid and the y=0 plane gives a hyperbola. The intersection between the sphere in the y=0 plane gives a circle. Intersecting the circle and hyperbola gives the radius and x coordinate of the hyperboloid-sphere intersection circle. This circle contains the rotated scene point. The scene point is rotated around the y-axis, so intersecting the circle with the xz-plane through the scene point gives the rotated scene point. Sega is the angle between the scene point and rotated scene point within the xz-plane. Phi is the angle between the scene point and the xy-plane through the origin.

Cylindrical Camera

In various embodiments, each image coordinate maps to cylindrical coordinates (theta, height). For given lens coordinates, each cylindrical coordinate maps to a single camera ray. Theta is found by projecting the scene point on the xz-plane. The method of inversion for a pinhole stereoscopic cylindrical camera is first described. In the xz-plane, each theta maps to a single ray, touching the circle around the origin with a radius equal to the stereo separation. The theta is searched for which rotates this ray to pass through the projected scene point, which equals to rotating the projected scene point in the opposite orientation until it lies on the ray. Therefore, the intersection is searched for of the vertical ray with the circle through the projected scene point. The angle between this intersection point and the projected scene point equals theta. In the case of a finite aperture lens, the origin of the ray lies on a finite aperture lens in the ray does not touch the circle with radius equal to the stereo separation. However, the ray does touch another circle around the origin with adjusted radius r:

let d=the stereo separation, l=the horizontal lens coordinate in units camera space, f=the focal distance.

Then $$r=(l+d)/\mathrm{sqrt}(((l*l)/(f*f))+1)$$

Theta is found by solving for the pinhole stereoscopic cylindrical camera with adjusted stereo separation r. The found theta is adjusted to obtain the theta for the original finite aperture camera:

$$\mathrm{theta}=(l>0)?\mathrm{theta}'+\mathrm{acos}(r/(d+l))$$

$$\mathrm{otherwise:\ theta'}-\mathrm{acos}(r/(d+l))$$

Photo to Geometry Projection

In various embodiments, the inverse scene to camera projection can also be used to map points on 3D geometry (such as matte objects in a computer generated (CG) scene) to 2D images (such as a backplate photo) captured using a physical Omni-directional Stereo Camera.

In various embodiments in accordance with the present disclosure add depth of field effects to omni-directional cameras. Furthermore, various embodiments extend this to include stereo omni-directional cameras and at least provide an efficient analytical method for mapping scene points back to camera space, desired for the integration of the new camera model with advanced physically based rendering algorithms such as bidirectional path tracing.

FIG. 1 is a flow diagram of a method 100 for rendering an image in accordance with various embodiments of the present disclosure. Although specific operations are disclosed in FIG. 1, such operations are examples. The method 100 may not include all of the operations illustrated by FIG. 1. Also, method 100 may include various other operations and/or variations of the operations shown. Likewise, the sequence of the operations of flow diagram 100 can be modified. It is appreciated that not all of the operations in flow diagram 100 may be performed. In various embodiments, one or more of the operations of method 100 can be controlled or managed by software, by firmware, by hardware or by any combination thereof, but is not limited to such. Method 100 can include processes of embodiments of the present disclosure which can be controlled or managed by a processor(s) and/or electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium or memory.

At operation 102, construct scene point p through a ray tracing technique. It is pointed out that operation 102 can be implemented in a wide variety of ways. For example, in various embodiments, the ray tracing technique at operation 102 can include, but is not limited to, Monte Carlo ray tracing technique, and the like. Note that operation 102 can be implemented in any manner similar to that described and/or shown herein, but is not limited to such.

At operation 104 of FIG. 1, project p back to screen pixel s for 360 VR camera model. It is pointed out that operation 104 can be implemented in a wide variety of ways. For example, in various embodiments, at operation 104 a cylindrical camera method 300 of FIG. 3 can be performed. Furthermore, in various embodiments, at operation 104 a spherical camera method 400 of FIG. 4 can be performed. It is noted that operation 104 can be implemented in any manner similar to that described and/or shown herein, but is not limited to such.

At operation 106, render energy contribution to the camera framebuffer at location s. Note that operation 106 can be implemented in a wide variety of ways. For example, operation 106 can be implemented in any manner similar to that described and/or shown herein, but is not limited to such.

Figure 2:
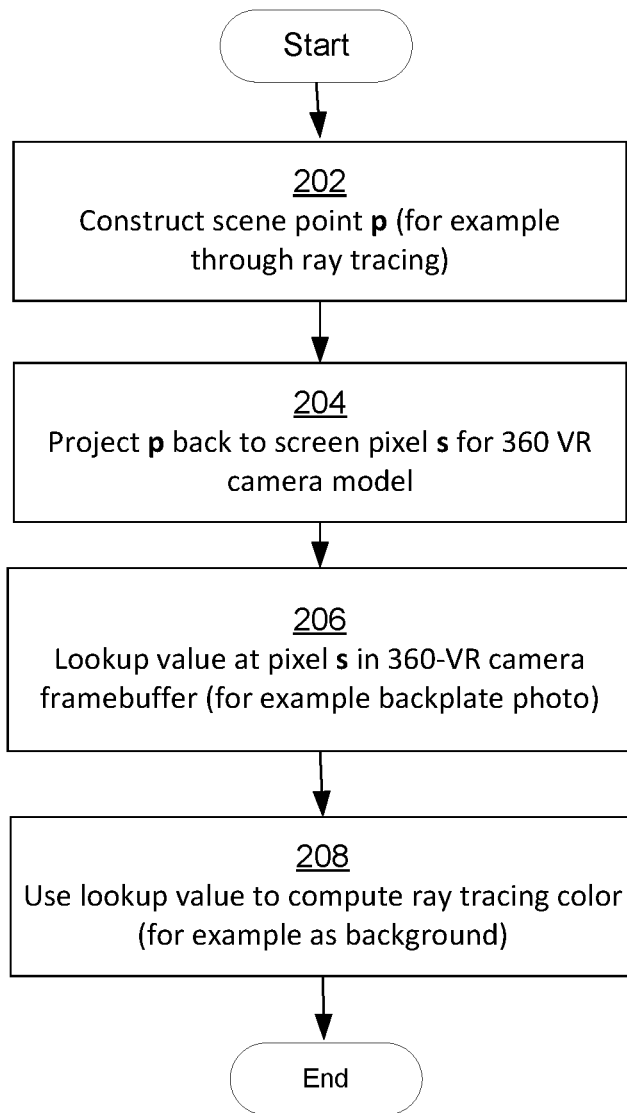
FIG. 2 is a flow diagram of a method for rendering an image augmented with a photograph made by an actual physical 360 virtual reality (VR) camera in accordance with various embodiments of the present disclosure.

FIG. 2 is a flow diagram of a method 200 for rendering an image augmented with a photograph made by an actual physical 360 VR camera in accordance with various embodiments of the present disclosure. Although specific operations are disclosed in FIG. 2, such operations are examples. The method 200 may not include all of the operations illustrated by FIG. 2. Also, method 200 may include various other operations and/or variations of the operations shown. Likewise, the sequence of the operations of flow diagram 200 can be modified. It is appreciated that not all of the operations in flow diagram 200 may be performed. In various embodiments, one or more of the operations of method 200 can be controlled or managed by software, by firmware, by hardware or by any combination thereof, but is not limited to such. Method 200 can include processes of embodiments of the present disclosure which can be controlled or managed by a processor(s) and/or electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium or memory.

At operation 202, construct scene point p through a ray tracing technique. It is noted that operation 202 can be implemented in a wide variety of ways. For example, in various embodiments, the ray tracing technique at operation 202 can include, but is not limited to, Monte Carlo ray tracing technique, and the like. Note that operation 202 can be implemented in any manner similar to that described and/or shown herein, but is not limited to such.

At operation 204 of FIG. 2, project p back to screen pixel s for 360 VR camera model. It is pointed out that operation 204 can be implemented in a wide variety of ways. For example, in various embodiments, at operation 204 a cylindrical camera method 300 of FIG. 3 can be performed. Moreover, in various embodiments, at operation 204 a spherical camera method 400 of FIG. 4 can be performed. Note that operation 204 can be implemented in any manner similar to that described and/or shown herein, but is not limited to such.

At operation 206, lookup value at pixel s in 360 VR camera framebuffer (e.g., backplate photograph). It is noted that operation 206 can be implemented in a wide variety of ways. For example, operation 206 may be implemented in any manner similar to that described and/or shown herein, but is not limited to such.

At operation 208 of FIG. 2, use lookup value to compute ray tracing color (e.g., as background). It is pointed out that operation 208 can be implemented in a wide variety of ways. For example, operation 208 may be implemented in any manner similar to that described and/or shown herein, but is not limited to such.

Figure 3:
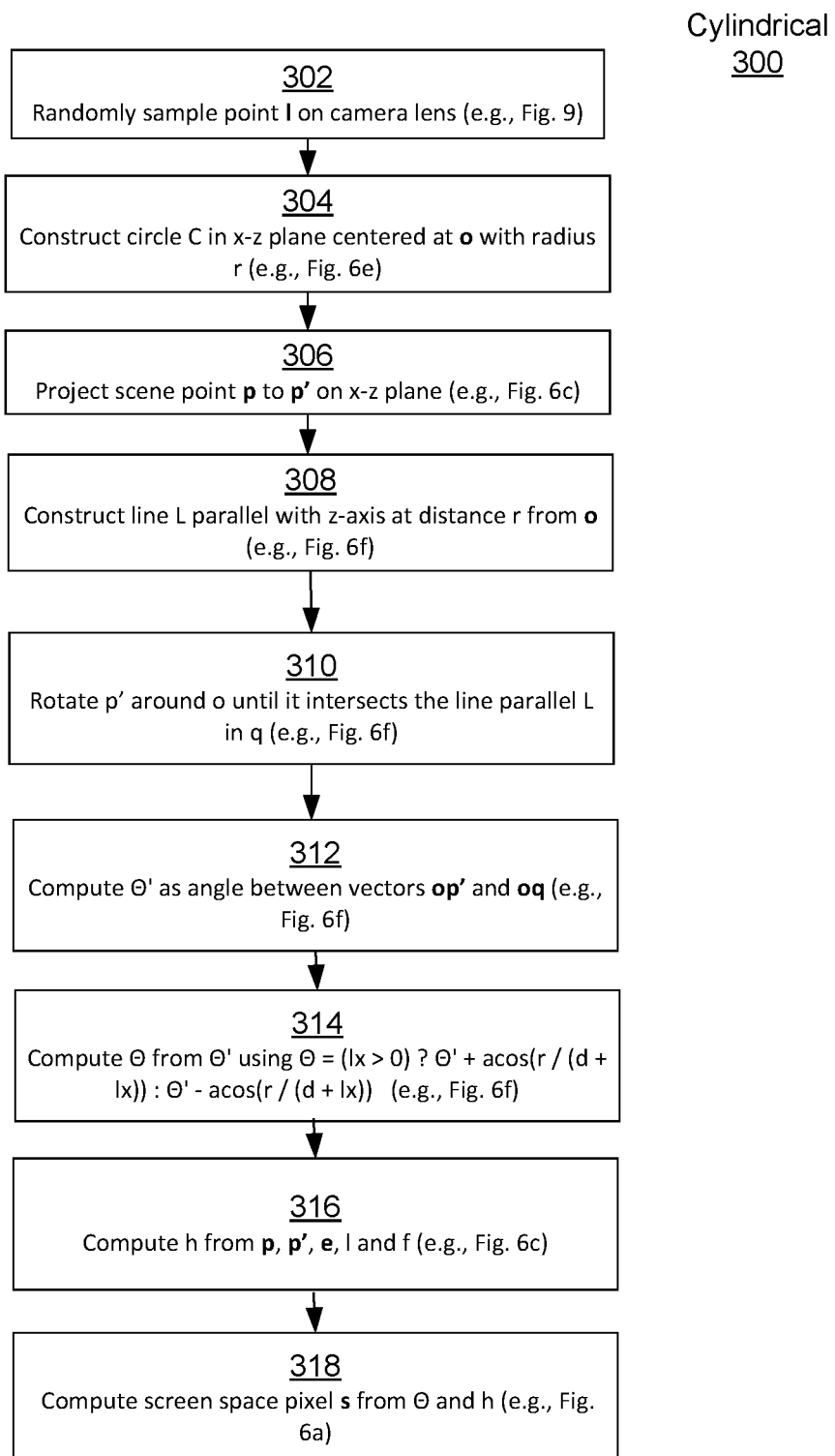
FIG. 3 is a flow diagram of a method including a cylindrical 360 VR camera model, a cylindrical finite aperture model, and a cylindrical inversion process in accordance with various embodiments of the present disclosure.

FIG. 3 is a flow diagram of a method 300 including a cylindrical 360 VR camera model, a cylindrical finite aperture model, and a cylindrical inversion process in accordance with various embodiments of the present disclosure. Although specific operations are disclosed in FIG. 3, such operations are examples. The method 300 may not include all of the operations illustrated by FIG. 3. Also, method 300 may include various other operations and/or variations of the operations shown. Likewise, the sequence of the operations of flow diagram 300 can be modified. It is appreciated that not all of the operations in flow diagram 300 may be performed. In various embodiments, one or more of the operations of method 300 can be controlled or managed by software, by firmware, by hardware or by any combination thereof, but is not limited to such. Method 300 can include processes of embodiments of the present disclosure which can be controlled or managed by a processor(s) and/or electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium or memory.

Figure 5:
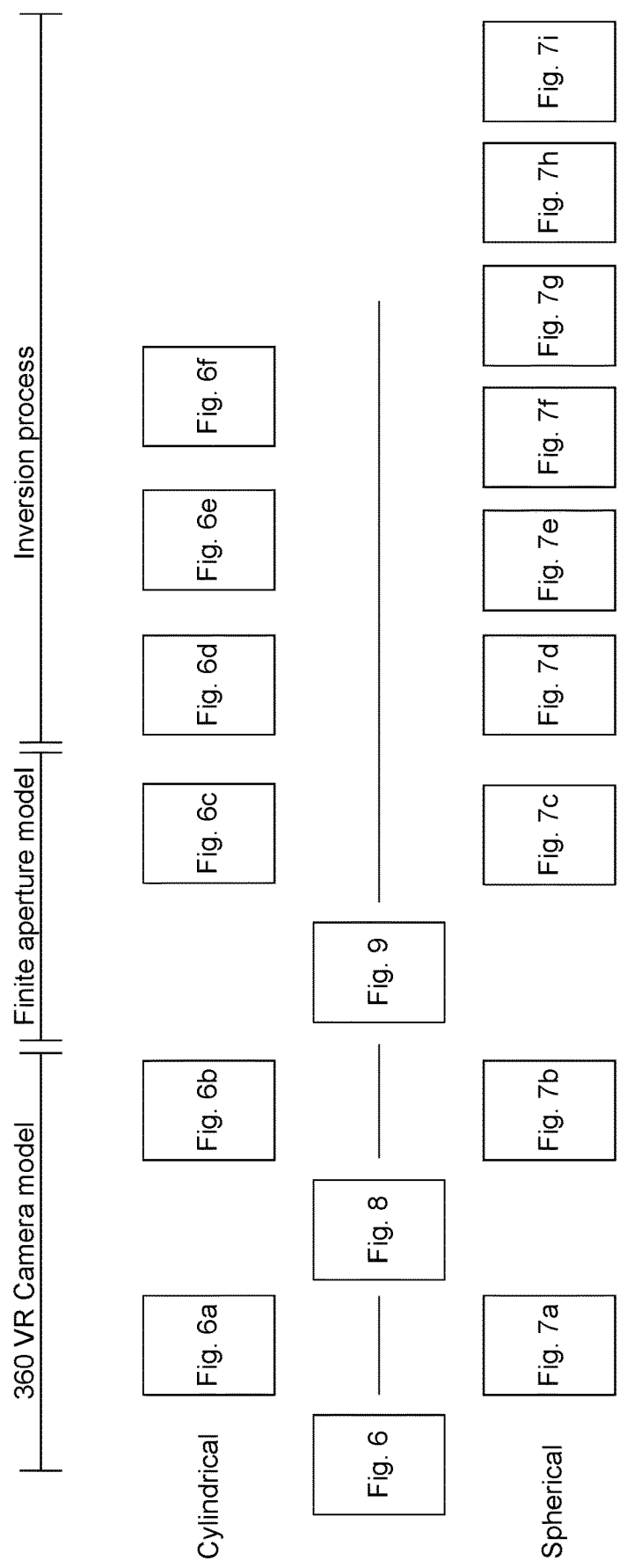
FIG. 5 is an overview of 360 VR camera models, finite aperture models, and inversion processes in accordance with various embodiments of the present disclosure.
Figure 6:
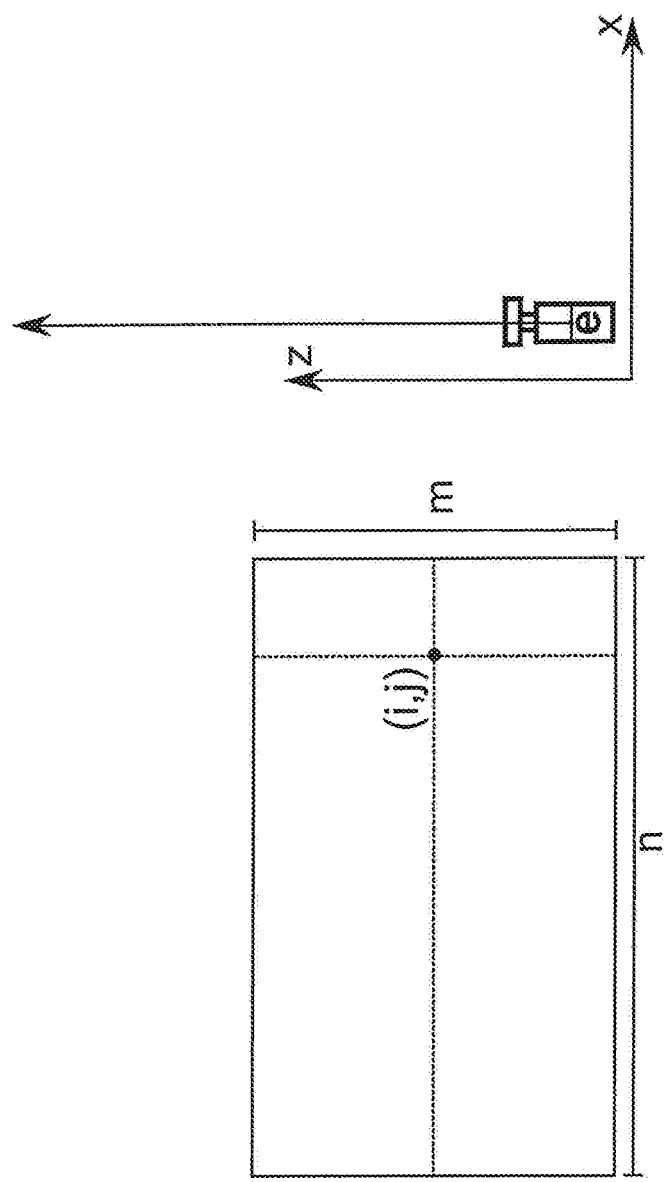
FIG. 6 illustrates a part of a cylindrical 360 VR camera model and a part of a spherical 360 VR camera model in accordance with various embodiments of the present disclosure.

FIG. 3 is described in combination with a portion of FIG. 5. It is noted that a portion of FIG. 5 includes at least an overview of a cylindrical 360 VR camera model, a cylindrical finite aperture model, and a cylindrical inversion process in accordance with various embodiments of the present disclosure. For example, FIG. 5 includes and indicates that FIGS. 6, 6a, 6b, and 8 can be associated with a cylindrical 360 VR camera model in various embodiments. In addition, FIG. 5 includes and indicates that FIGS. 6c and 9 can be associated with a cylindrical finite aperture model in various embodiments. Furthermore, FIG. 5 includes and indicates that FIGS. 6d, 6e, and 6f can be associated with a cylindrical inversion process in various embodiments. It is noted that at least each of FIGS. 6e, 7h, 7i, and 9 includes additional information not shown within FIG. 5.

Figure 9:
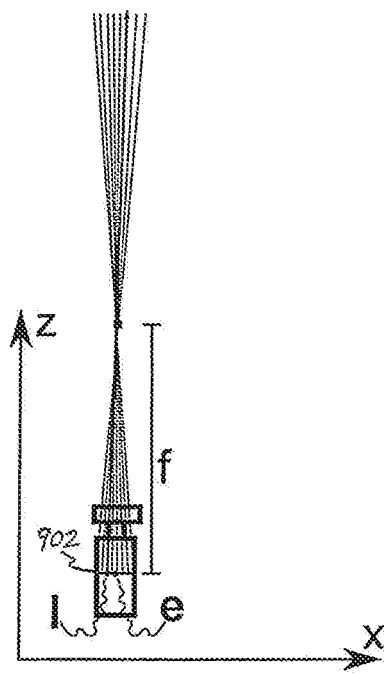
FIG. 9 illustrates a part of a cylindrical finite aperture model and a part of a spherical finite aperture model in accordance with various embodiments of the present disclosure.

At operation 302 of FIG. 3, randomly sample point l on camera lens. It is noted that operation 302 can be implemented in a wide variety of ways. For example, in various embodiments, randomly sample point l on camera lens 902 at operation 302 can be implemented in a manner as shown in FIG. 9. Note that within FIG. 9, f is at focal distance from the camera lens 902. Operation 302 can be implemented in any manner similar to that described and/or shown herein, but is not limited to such.

At operation 304, construct circle C in xz-plane centered at o with radius r. It is pointed out that operation 304 can be implemented in a wide variety of ways. For example, in various embodiments, construct circle C in xz-plane centered at o with radius r at operation 304 can be implemented in a manner as shown in FIG. 6e. Note that an equation for radius r is shown within FIG. 6e where d is equal to the stereo separation, l is equal to the horizontal lens coordinate in units camera space, and f is equal to the focal distance. Operation 304 can be implemented in any manner similar to that described and/or shown herein, but is not limited to such.

At operation 306 of FIG. 3, project scene point p to p' on xz-plane. Note that operation 306 can be implemented in a wide variety of ways. For example, in various embodiments, project scene point p to p' on xz-plane at operation 306 can be implemented in a manner as shown in FIG. 6c. It is pointed out that an equation for h is shown within FIG. 6c. Operation 306 can be implemented in any manner similar to that described and/or shown herein, but is not limited to such.

At operation 308, construct line L parallel with z-axis at distance r from o. It is noted that operation 308 can be implemented in a wide variety of ways. For example, in various embodiments, construct line L parallel with z-axis at distance r from o at operation 308 can be implemented in a manner as shown in FIG. 6f. Operation 308 can be implemented in any manner similar to that described and/or shown herein, but is not limited to such.

At operation 310 of FIG. 3, rotate p' around o until it intersects the line parallel L in q. Note that operation 310 can be implemented in a wide variety of ways. For example, in various embodiments, rotate p' around o until it intersects the line parallel L in q at operation 310 can be implemented in a manner as shown in FIG. 6f. Operation 310 can be implemented in any manner similar to that described and/or shown herein, but is not limited to such.

At operation 312, compute $\Theta'$ as angle between vectors op' and oq (e.g., see FIG. 6f). It is pointed out that operation 312 can be implemented in a wide variety of ways. For example, in various embodiments, compute $\Theta'$ as angle between vectors op' and oq at operation 312 can be implemented in a manner as shown in FIG. 6f. Operation 312 can be implemented in any manner similar to that described and/or shown herein, but is not limited to such.

At operation 314 of FIG. 3, compute $\Theta$ from $\Theta'$ using $\Theta=(lx>0)?\Theta'+acos(r/(d+lx)): \Theta'-acos(r/(d+lx))$. It is noted that operation 314 can be implemented in a wide variety of ways. For example, in various embodiments, compute $\Theta$ from $\Theta'$ using $\Theta=(lx>0)?\Theta'+acos(r/(d+lx)): \Theta'-acos(r/(d+lx))$ at operation 314 can be implemented in a manner as shown in FIG. 6f. Note that equations for $\Theta$ are shown within FIG. 6f. Operation 314 can be implemented in any manner similar to that described and/or shown herein, but is not limited to such.

At operation 316, compute h from p, p', e, l and f. Note that operation 316 can be implemented in a wide variety of ways. For example, in various embodiments, compute h from p, p', e, l and f at operation 316 can be implemented in a manner as shown in FIG. 6c. It is pointed out that an equation for h is shown within FIG. 6c. Operation 316 can be implemented in any manner similar to that described and/or shown herein, but is not limited to such.

Figure 6A:
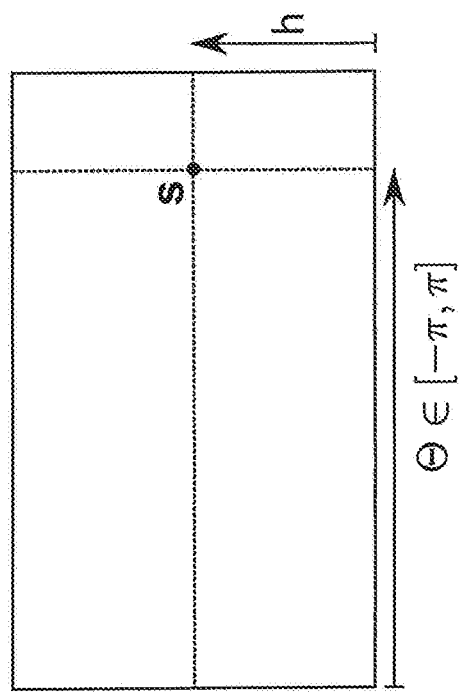
FIGS. 6a and 6b each illustrates a different part of a cylindrical 360 VR camera model in accordance with various embodiments of the present disclosure.
Figure 6B:
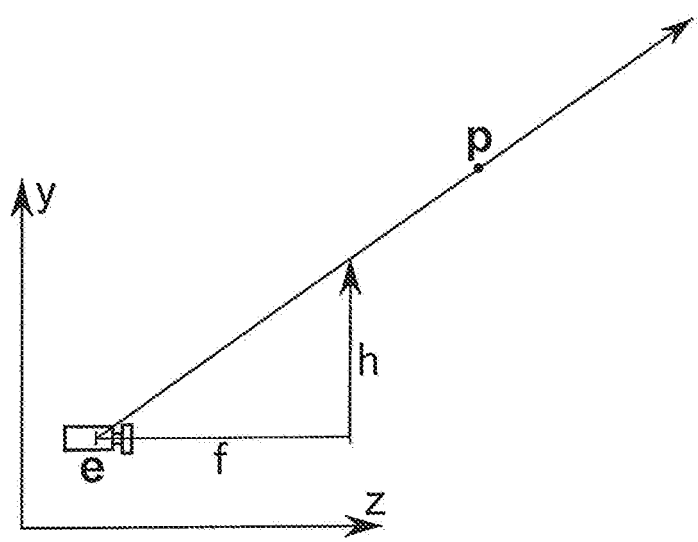
Figure 6C:
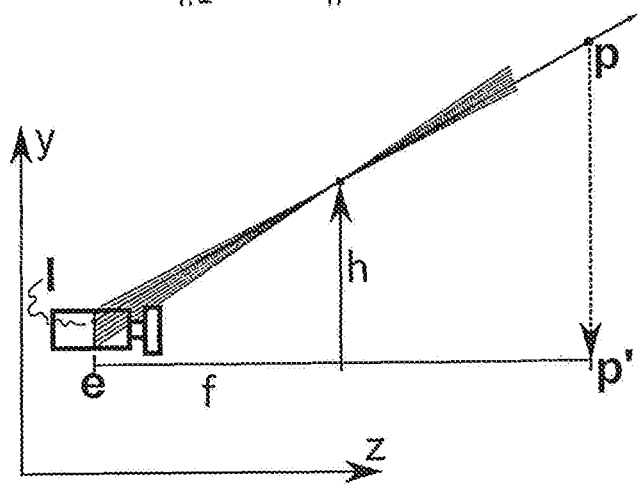
FIG. 6c illustrates a part of a cylindrical finite aperture model in accordance with various embodiments of the present disclosure.
Figure 6D:
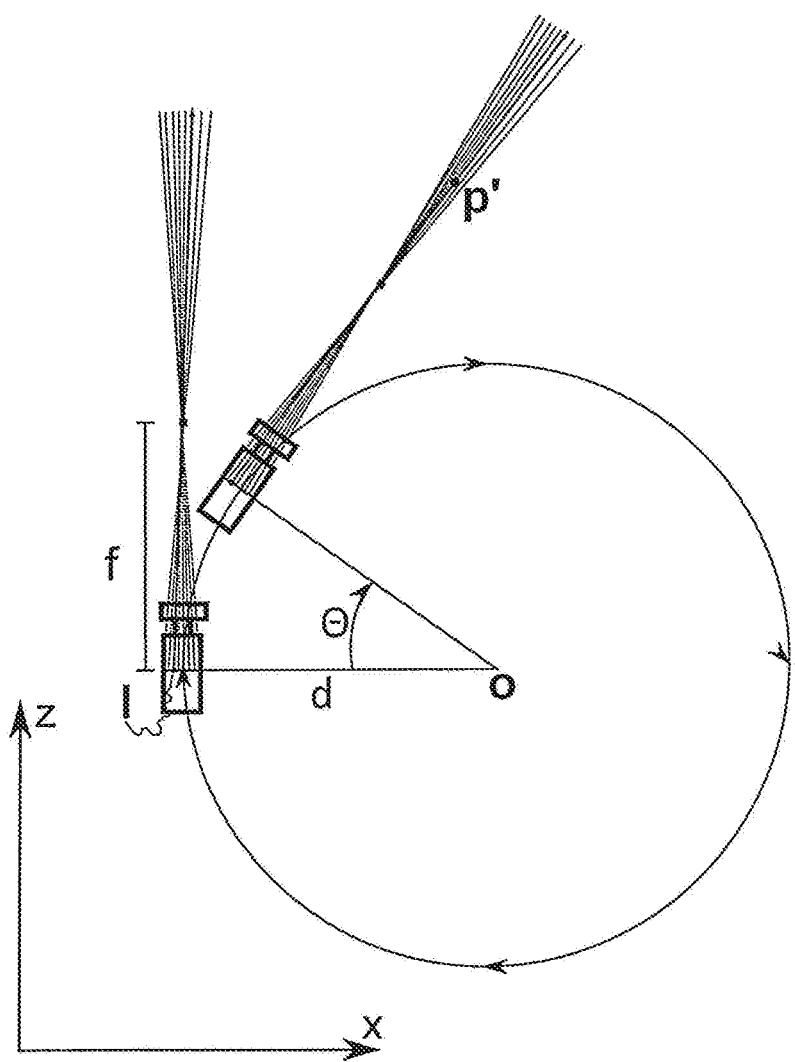
FIGS. 6d, 6e, and 6f each illustrates a different part of a cylindrical inversion process in accordance with various embodiments of the present disclosure.
Figure 6E:
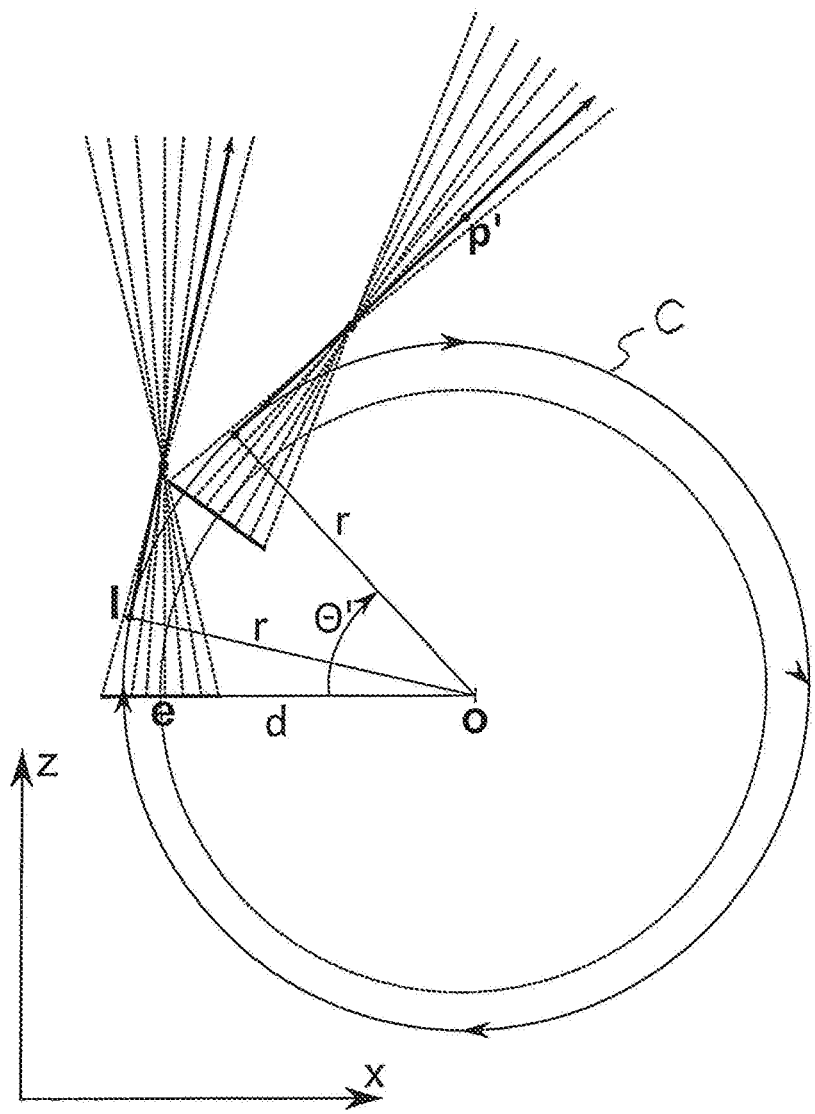
Figure 6F:
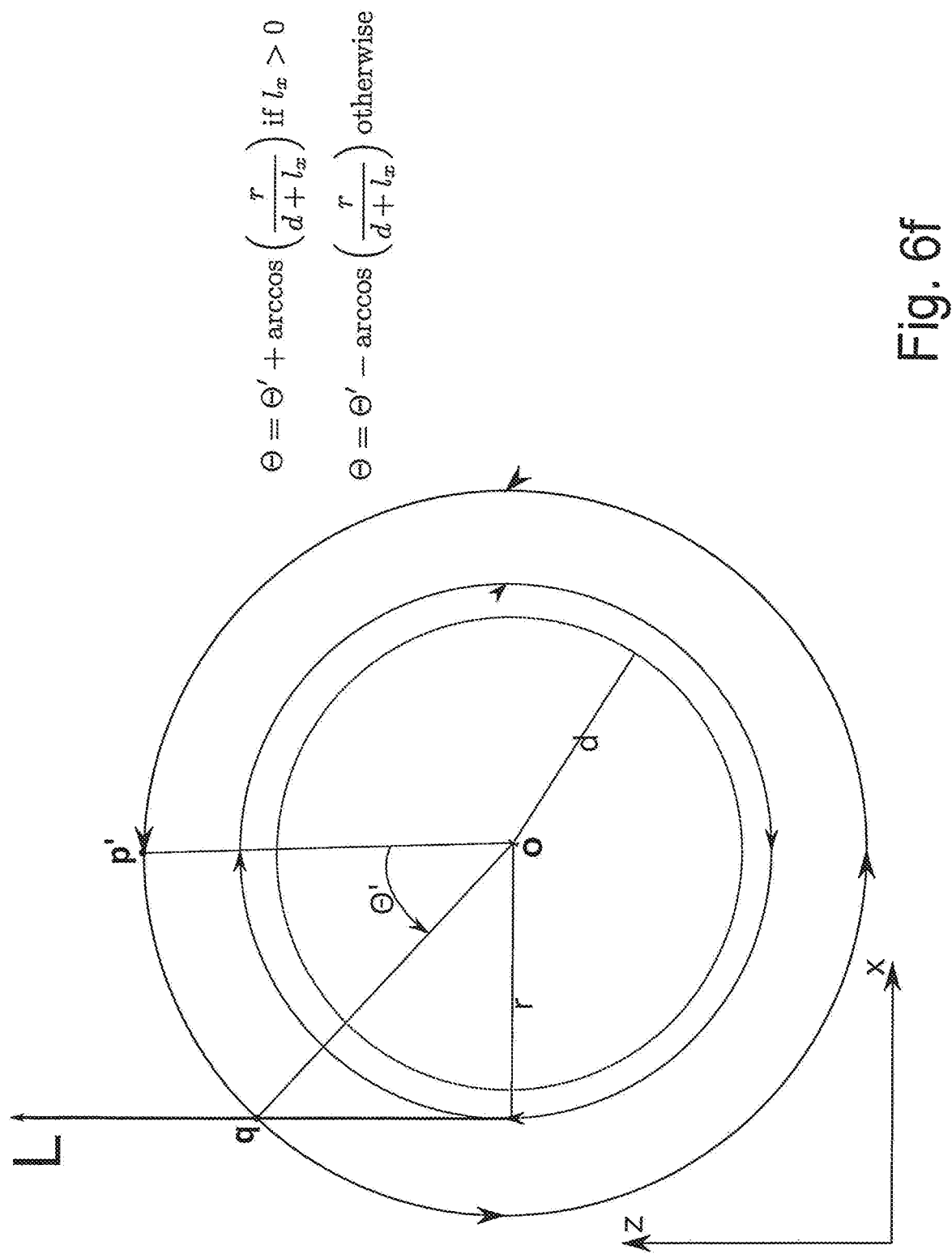

At operation 318 of FIG. 3, compute screen space pixels from $\Theta$ and h (e.g., see FIG. 6a). It is noted that operation 318 can be implemented in a wide variety of ways. For example, in various embodiments, compute screen space pixel s from $\Theta$ and h at operation 318 can be implemented in a manner as shown in FIG. 6a. Operation 318 can be implemented in any manner similar to that described and/or shown herein, but is not limited to such.

Figure 4:
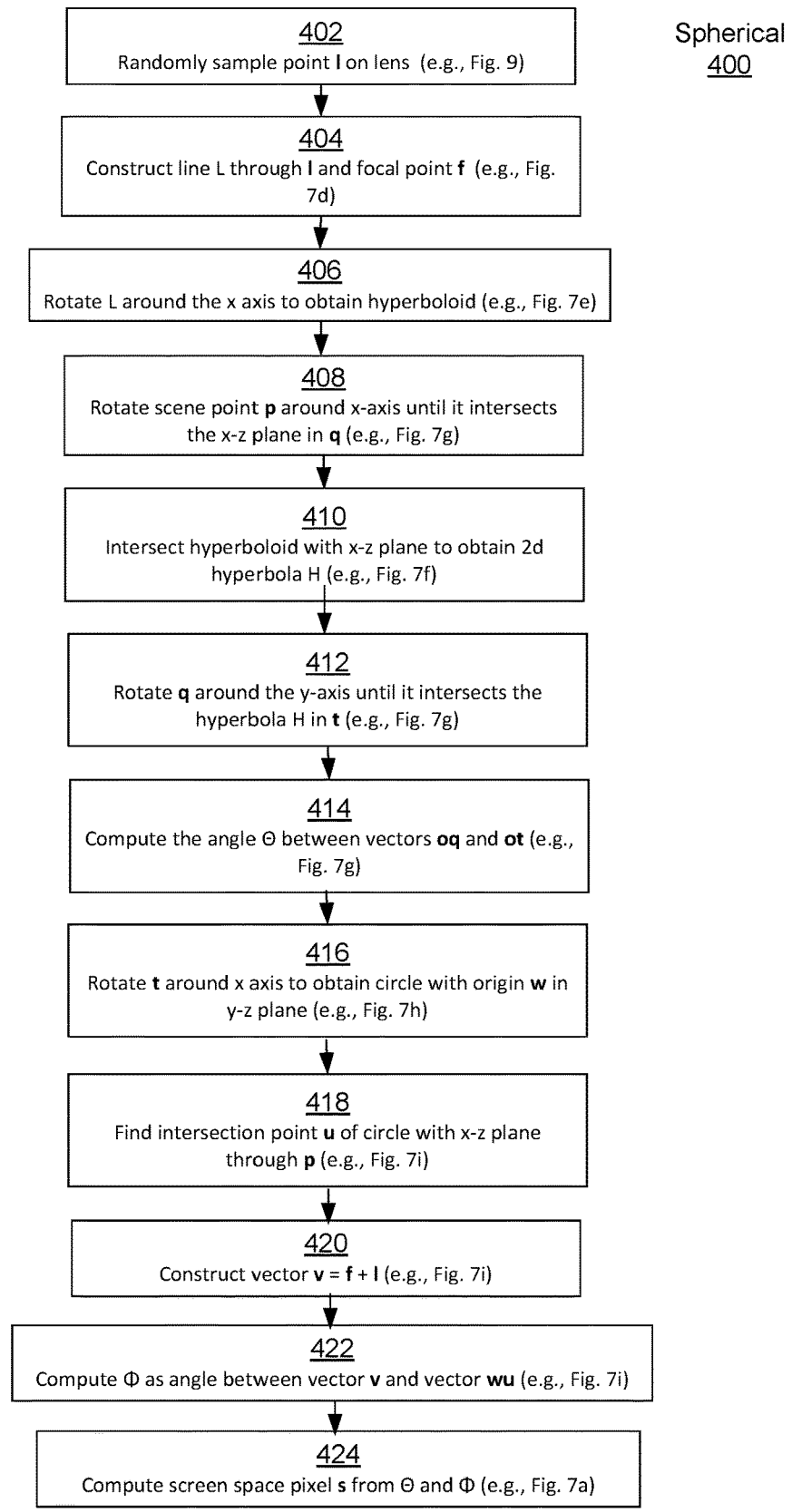
FIG. 4 is a flow diagram of a method including a spherical 360 VR camera model, a spherical finite aperture model, and a spherical inversion process in accordance with various embodiments of the present disclosure.

FIG. 4 is a flow diagram of a method 400 including a spherical 360 VR camera model, a spherical finite aperture model, and a spherical inversion process in accordance with various embodiments of the present disclosure. Although specific operations are disclosed in FIG. 4, such operations are examples. The method 400 may not include all of the operations illustrated by FIG. 4. Also, method 400 may include various other operations and/or variations of the operations shown. Likewise, the sequence of the operations of flow diagram 400 can be modified. It is appreciated that not all of the operations in flow diagram 400 may be performed. In various embodiments, one or more of the operations of method 400 can be controlled or managed by software, by firmware, by hardware or by any combination thereof, but is not limited to such. Method 400 can include processes of embodiments of the present disclosure which can be controlled or managed by a processor(s) and/or electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium or memory.

FIG. 4 is described in combination with a portion of FIG. 5. It is point out that a portion of FIG. 5 includes at least an overview of a spherical 360 VR camera model, a spherical finite aperture model, and a spherical inversion process in accordance with various embodiments of the present disclosure. For example, FIG. 5 includes and indicates that FIGS. 6, 7a, 7b, and 8 can be associated with a spherical 360 VR camera model in various embodiments. Moreover, FIG. 5 includes and indicates that FIGS. 7c and 9 can be associated with a spherical finite aperture model in various embodiments. Additionally, FIG. 5 includes and indicates that FIGS. 7d, 7e, 7f, 7g, 7h, and 7i can be associated with a spherical inversion process in various embodiments. It is noted that at least each of FIGS. 6e, 7h, 7i, and 9 includes additional information not shown within FIG. 5.

At operation 402, randomly sample point l on camera lens. It is noted that operation 402 can be implemented in a wide variety of ways. For example, in various embodiments, randomly sample point l on camera lens 902 at operation 402 can be implemented in a manner as shown in FIG. 9. Note that within FIG. 9, f is at focal distance from the camera lens 902. Operation 402 can be implemented in any manner similar to that described and/or shown herein, but is not limited to such.

At operation 404 of FIG. 4, construct line L through l and focal point f. It is pointed out that operation 404 can be implemented in a wide variety of ways. For example, in various embodiments, construct line L through l and focal point f at operation 404 can be implemented in a manner as shown in FIG. 7d. Operation 404 can be implemented in any manner similar to that described and/or shown herein, but is not limited to such.

At operation 406, rotate L around the x axis to obtain hyperboloid. Note that operation 406 can be implemented in a wide variety of ways. For example, in various embodiments, rotate L around the x axis to obtain hyperboloid at operation 406 can be implemented in a manner as shown in FIG. 7e. It is noted that the hyperboloid is not explicitly drawn within FIG. 7e. Instead, the hyperboloid is indicated by the rotation (circle of arrows) of the line L around the x axis. Operation 406 can be implemented in any manner similar to that described and/or shown herein, but is not limited to such.

At operation 408 of FIG. 4, rotate scene point p around x-axis until it intersects the xz-plane in q. It is pointed out that operation 408 can be implemented in a wide variety of ways. For example, in various embodiments, rotate scene point p around x-axis until it intersects the xz-plane in q at operation 408 can be implemented in a manner as shown in FIG. 7g. Operation 408 can be implemented in any manner similar to that described and/or shown herein, but is not limited to such.

At operation 410, intersect hyperboloid with xz-plane to obtain two dimensional (2D) hyperbola H. It is noted that operation 410 can be implemented in a wide variety of ways. For example, in various embodiments, intersect hyperboloid with xz-plane to obtain 2D hyperbola H at operation 410 can be implemented in a manner as shown in FIG. 7f. Operation 410 can be implemented in any manner similar to that described and/or shown herein, but is not limited to such.

At operation 412 of FIG. 4, rotate q around the y-axis until it intersects the hyperbola H in t. Note that operation 412 can be implemented in a wide variety of ways. For example, in various embodiments, rotate q around the y-axis until it intersects the hyperbola H in t at operation 412 can be implemented in a manner as shown in FIG. 7g. Operation 412 can be implemented in any manner similar to that described and/or shown herein, but is not limited to such.

At operation 414, compute the angle Θ between vectors oq and ot. It is pointed out that operation 414 can be implemented in a wide variety of ways. For example, in various embodiments, compute the angle Θ between vectors oq and ot at operation 414 can be implemented in a manner as shown in FIG. 7g. Operation 414 can be implemented in any manner similar to that described and/or shown herein, but is not limited to such.

At operation 416 of FIG. 4, rotate t around x-axis to obtain circle with origin w in yz-plane. Note that operation 416 can be implemented in a wide variety of ways. For example, in various embodiments, rotate t around x-axis to obtain circle 702 with origin w in yz-plane at operation 416 can be implemented in a manner as shown in FIG. 7h. Operation 416 can be implemented in any manner similar to that described and/or shown herein, but is not limited to such.

At operation 418, find intersection point u of circle with xz-plane through p. It is pointed out that operation 418 can be implemented in a wide variety of ways. For example, in various embodiments, find intersection point u of circle 702 with xz-plane through p at operation 418 can be implemented in a manner as shown in FIG. 7h. Operation 418 can be implemented in any manner similar to that described and/or shown herein, but is not limited to such.

At operation 420 of FIG. 4, construct vector v=f+l. It is noted that operation 420 can be implemented in a wide variety of ways. For example, in various embodiments, construct vector v=f+l at operation 420 can be implemented in a manner as shown in FIG. 7i. Operation 420 can be implemented in any manner similar to that described and/or shown herein, but is not limited to such.

At operation 422, compute φ as angle between vector v and vector wu. Note that operation 422 can be implemented in a wide variety of ways. For example, in various embodiments, compute φ as angle between vector v and vector wu at operation 422 can be implemented in a manner as shown in FIG. 7i. Operation 422 can be implemented in any manner similar to that described and/or shown herein, but is not limited to such.

Figure 7A:
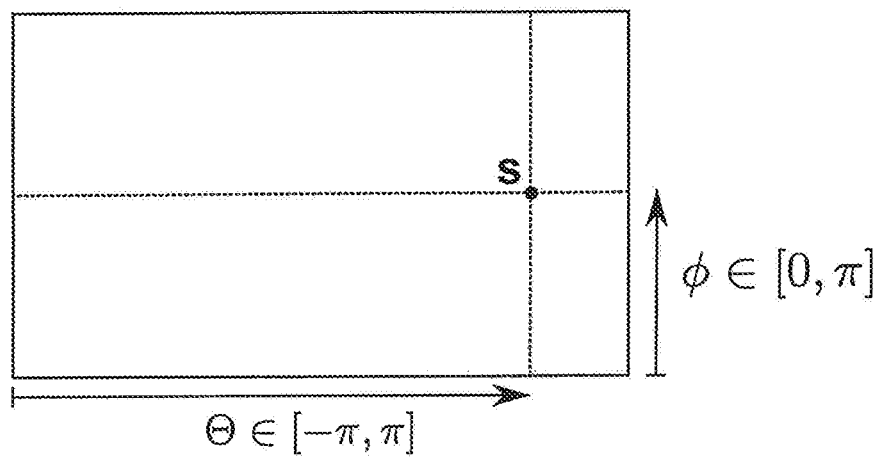
FIGS. 7a and 7b each illustrates a different part of a spherical 360 VR camera model in accordance with various embodiments of the present disclosure.
Figure 7B:
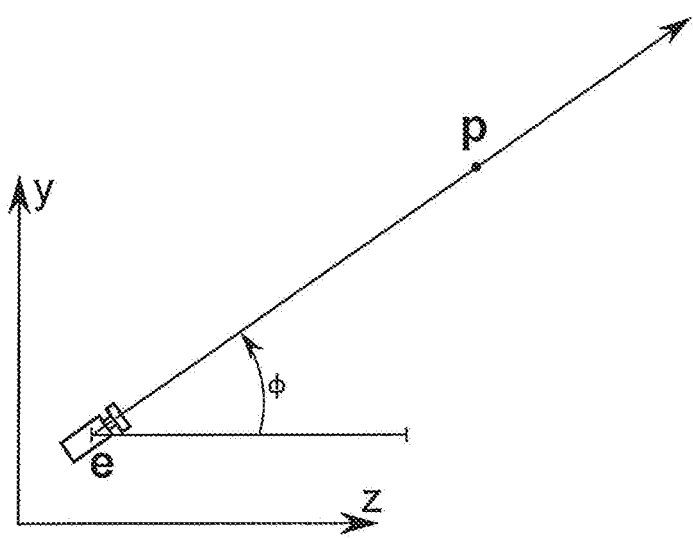
Figure 7C:
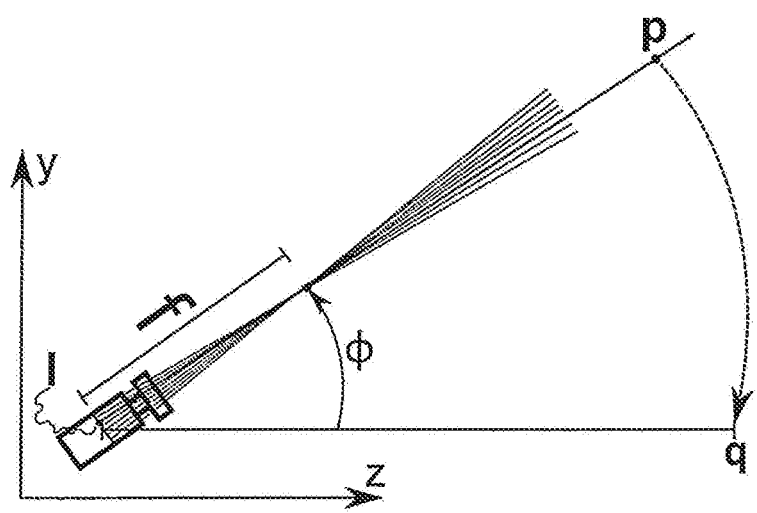
FIG. 7c illustrates a part of a spherical finite aperture model in accordance with various embodiments of the present disclosure.
Figure 7D:
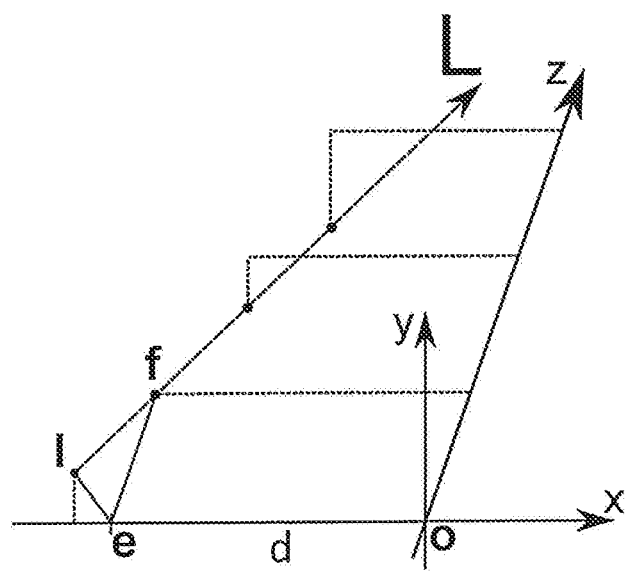
FIGS. 7d, 7e, 7f, 7g, 7h, and 7i each illustrates a different part of a spherical inversion process in accordance with various embodiments of the present disclosure.
Figure 7E:
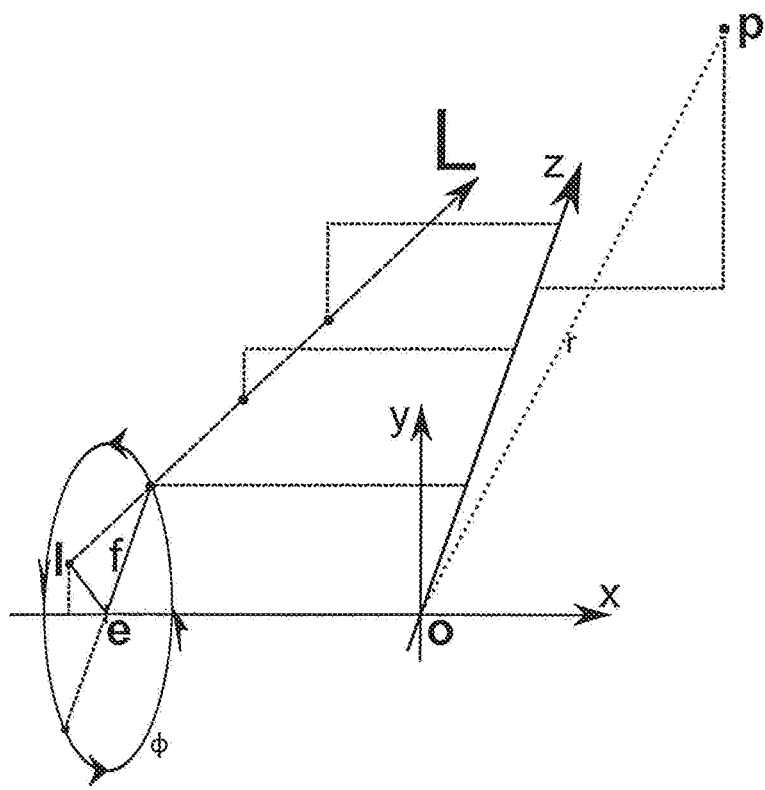
Figure 7F:
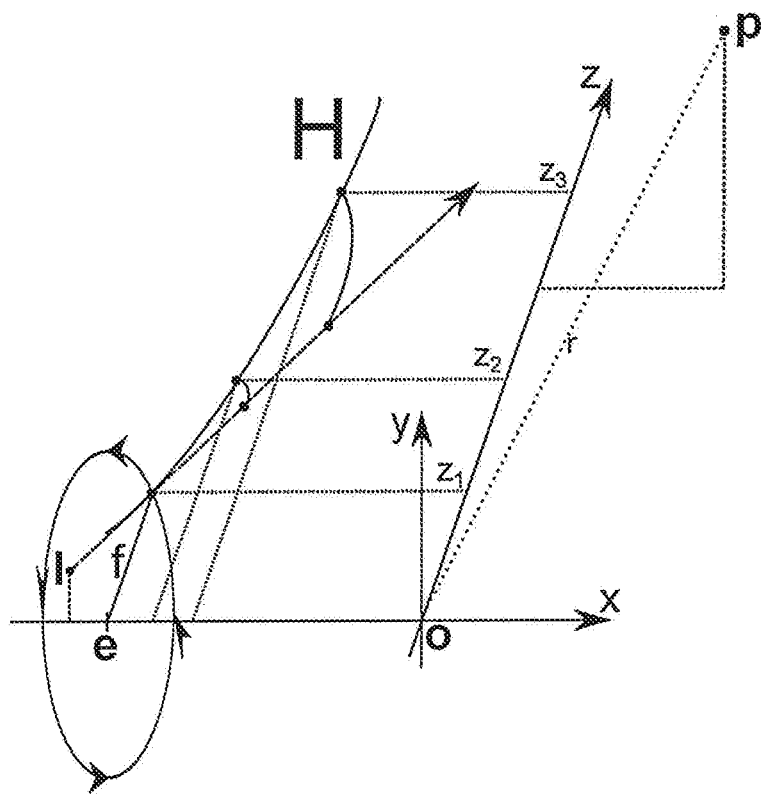
Figure 7G:
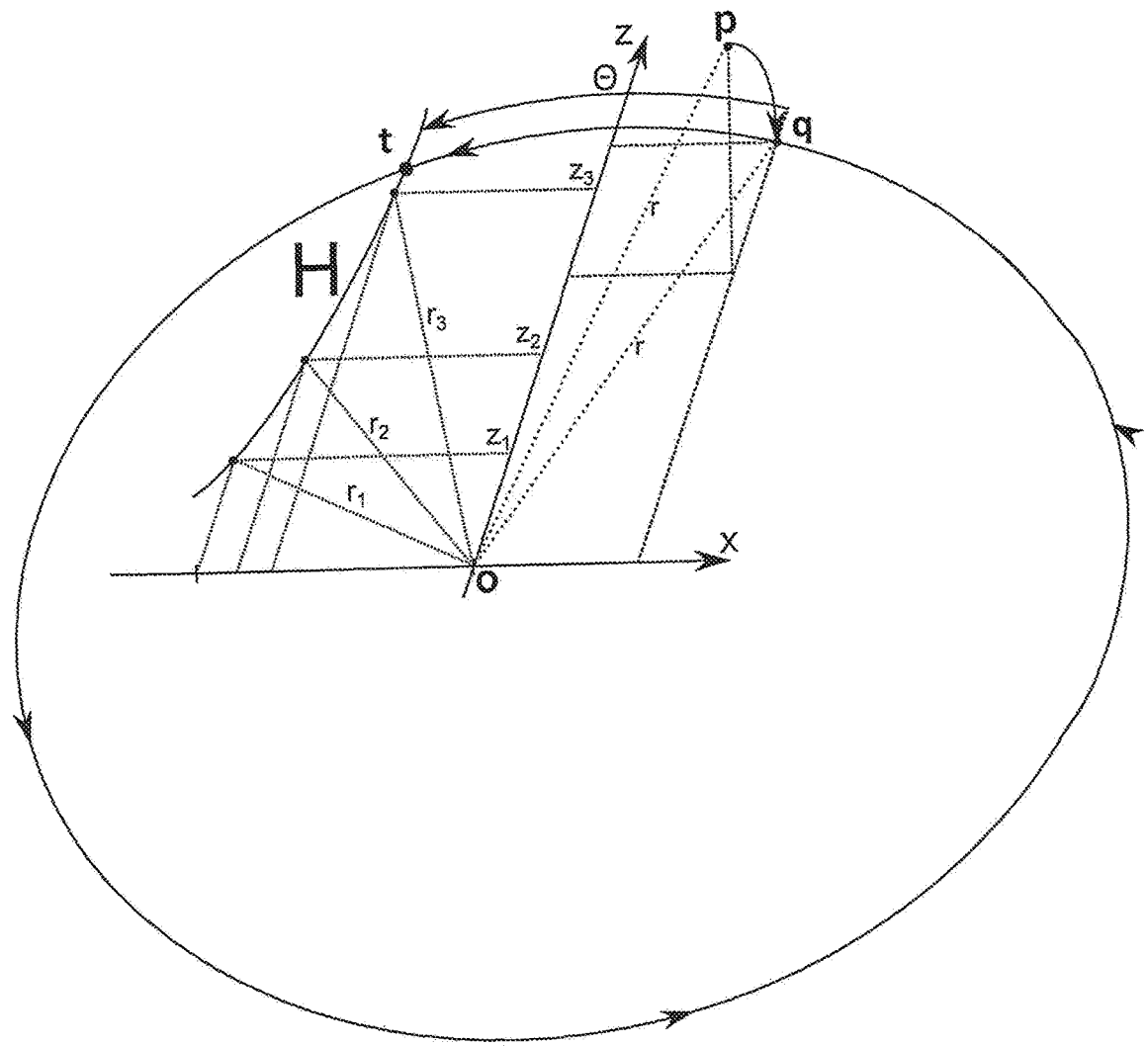
Figure 7H:
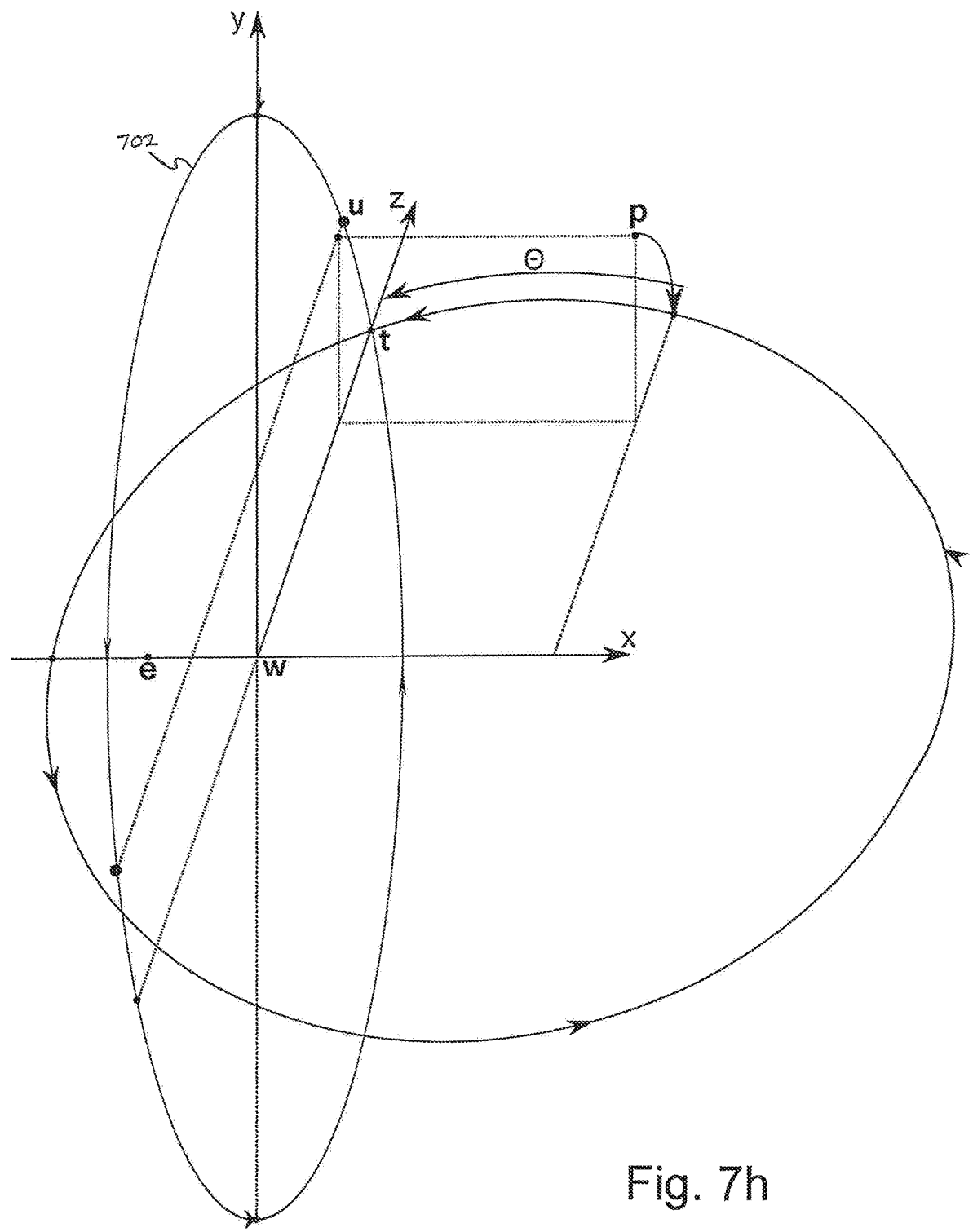
Figure 7I:
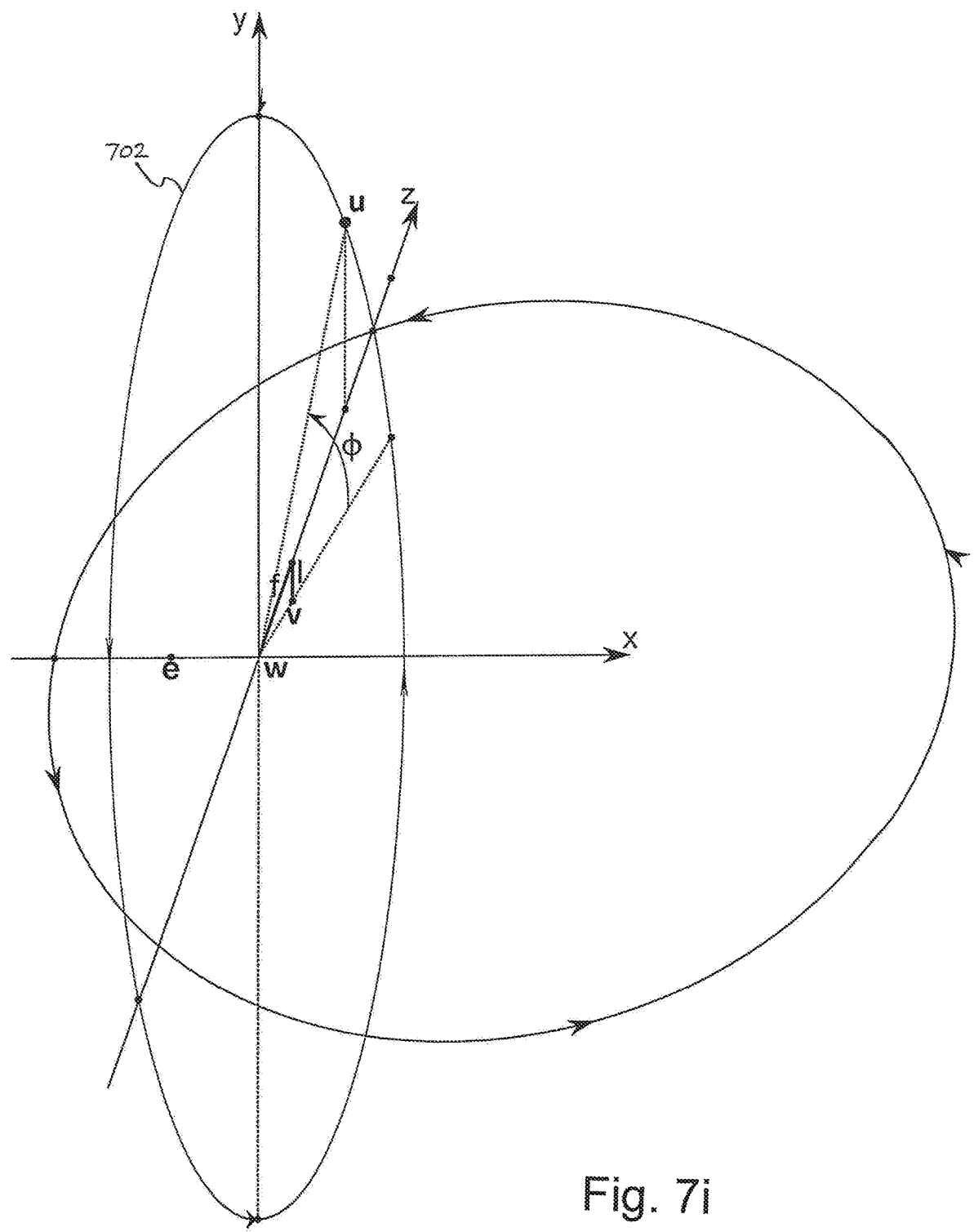
Figure 8:
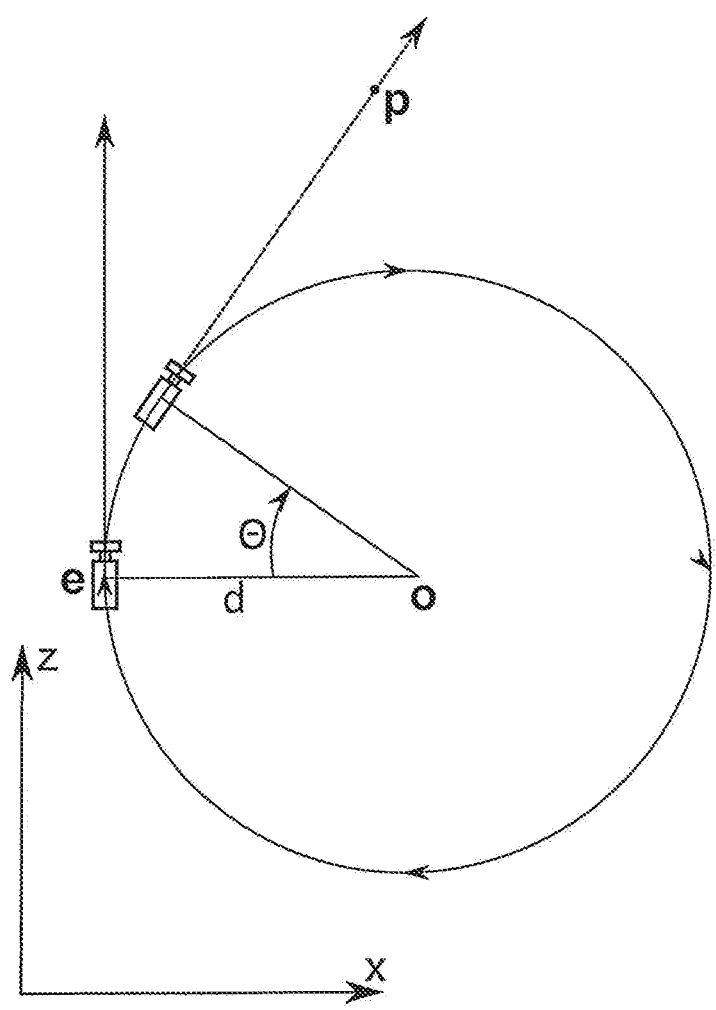
FIG. 8 illustrates a part of a cylindrical 360 VR camera model and a part of a spherical 360 VR camera model in accordance with various embodiments of the present disclosure.

At operation 424 of FIG. 4, compute screen space pixel s from Θ and φ (e.g., see FIG. 7a). It is pointed out that operation 424 can be implemented in a wide variety of ways. For example, in various embodiments, compute screen space pixel s from Θ and φ at operation 424 can be implemented in a manner as shown in FIG. 7a. Operation 424 can be implemented in any manner similar to that described and/or shown herein, but is not limited to such.

With reference to FIGS. 6, 6a, and 7a, please note that they can include mapping from [theta,h] and [theta,phi] spaces to a pixel at coordinates (i,j) in an n by m pixel image.

Figure 10:
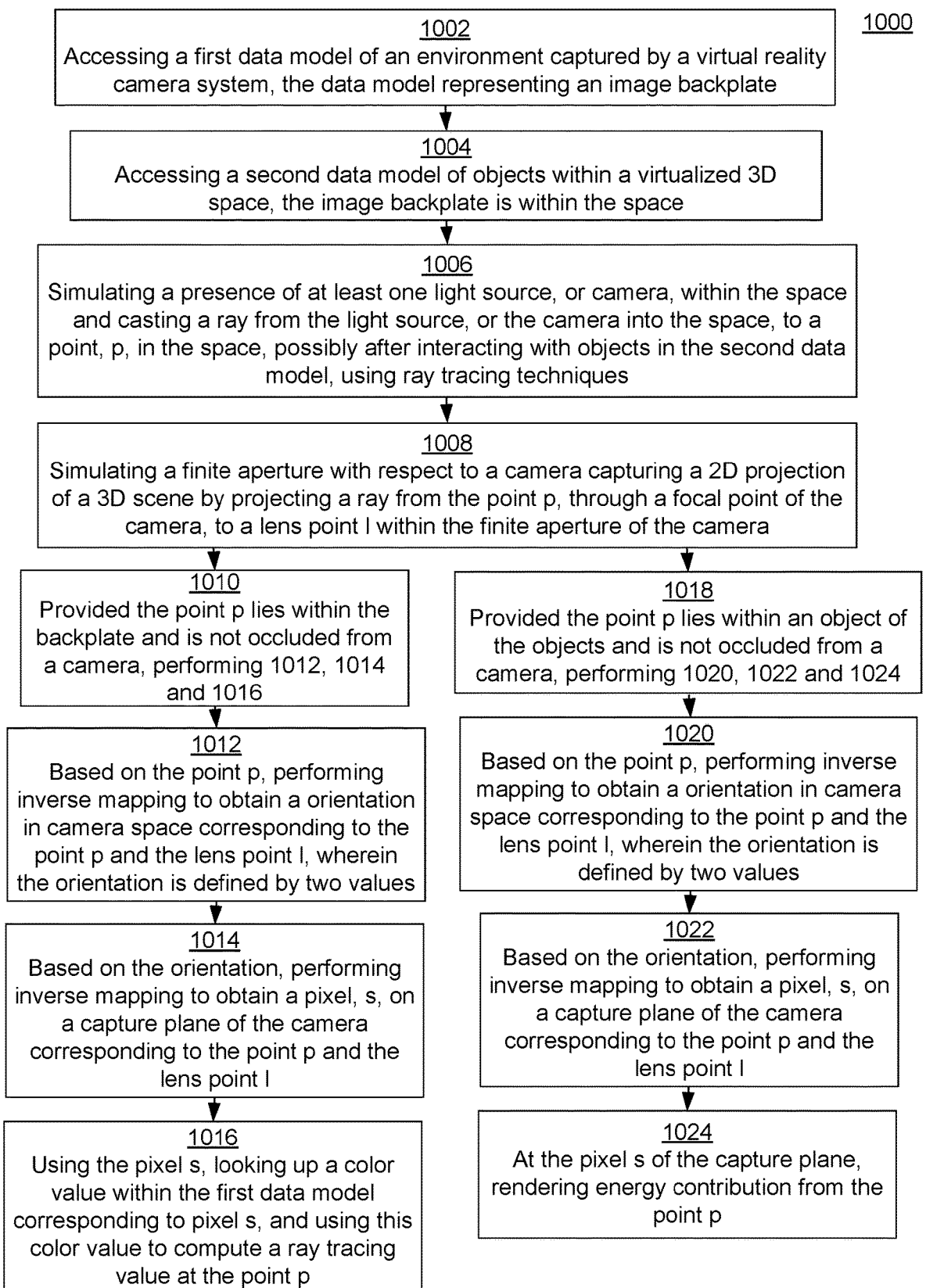
FIG. 10 is a flow diagram of a method for generating an image in accordance with various embodiments of the present disclosure.

FIG. 10 is a flow diagram of a method 1000 for generating an image in accordance with various embodiments of the present disclosure. Although specific operations are disclosed in FIG. 10, such operations are examples. The method 1000 may not include all of the operations illustrated by FIG. 10. Also, method 1000 may include various other operations and/or variations of the operations shown. Likewise, the sequence of the operations of flow diagram 1000 can be modified. It is appreciated that not all of the operations in flow diagram 1000 may be performed. In various embodiments, one or more of the operations of method 1000 can be controlled or managed by software, by firmware, by hardware or by any combination thereof, but is not limited to such. Method 1000 can include processes of embodiments of the present disclosure which can be controlled or managed by a processor(s) and/or electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium or memory.

At operation 1002, accessing a first data model of an environment captured by a virtual reality camera system, the data model representing an image backplate. Note that operation 1002 can be implemented in a wide variety of ways. For example, in various embodiments, at operation 1002 the virtual reality (VR) camera system is a cylindrical VR 360 camera system. In various embodiments, at operation 1002 the virtual reality camera system is a spherical VR 360 camera system. In various embodiments, at operation 1002 the first data model includes pixels that are referenced by the two values. Operation 1002 can be implemented in any manner similar to that described and/or shown herein, but is not limited to such.

At operation 1004 of FIG. 10, accessing a second data model of objects within a virtualized three dimensional (3D) space, wherein the image backplate is within the space. Note that operation 1004 can be implemented in a wide variety of ways. For example, in various embodiments, at operation 1004 the second data model includes pixels that are referenced by the two values. Operation 1004 can be implemented in any manner similar to that described and/or shown herein, but is not limited to such.

At operation 1006, simulating a presence of at least one light source, or camera, within the space and casting a ray from the light source, or the camera into the space, to a point, p, in the space, possibly after interacting with objects in the second data model, using ray tracing techniques. Note that operation 1006 can be implemented in a wide variety of ways. For example, in various embodiments, at operation 1006 the ray tracing techniques are Monte Carlo ray tracing techniques, but are not limited to such. Operation 1006 can be implemented in any manner similar to that described and/or shown herein, but is not limited to such.

At operation 1008 of FIG. 10, simulating a finite aperture with respect to a camera capturing a two dimensional (2D) projection of a 3D scene by projecting a ray from the point p, through a focal point of the camera, to a lens point l within the finite aperture of the camera. Note that operation 1008 can be implemented in a wide variety of ways. For example, in various embodiments, at operation 1008 the simulating the finite aperture with respect to the camera capturing a 2D projection of a 3D scene includes projecting a plurality of rays from the point p, through the focal point of the camera, to a plurality of lens points l across the finite aperture of the camera and further comprising performing a first group of operations 1010, 1012, 1014, and 1016 (described herein) and/or a second group of operations 1018, 1020, 1022, and 1024 (described herein) for each of the plurality of lens points lto determine a corresponding plurality of pixels s. In various embodiments, it is noted that the first group of operations 1010, 1012, 1014, and 1016, might be projecting to a different camera model. In this case, it projects to a plurality of lens points l across the finite aperture of the camera model corresponding to the physical camera system used to capture the backplate, not the camera used to capture the 2D projection of the virtual scene. Operation 1008 can be implemented in any manner similar to that described and/or shown herein, but is not limited to such. After completion of operation 1008, method 1000 can proceed to operation 1010 and/or operation 1018.

At operation 1010, provided the point p lies within the backplate and is not occluded from a camera, performing operations 1012, 1014, and 1016. Note that operation 1010 can be implemented in a wide variety of ways. For example, operation 1010 can be implemented in any manner similar to that described and/or shown herein, but is not limited to such.

At operation 1012 of FIG. 10, based on the point p, performing inverse mapping to obtain an orientation in camera space corresponding to the point p and the lens point l, wherein the orientation is defined by two values. Note that operation 1012 can be implemented in a wide variety of ways. For example, in various embodiments, at operation 1012 in a cylindrical VR 360 camera system the two values include theta and h and wherein theta is a camera angle within an xz-plane of the space associated with point p and wherein h is a height in a y coordinate in the camera space associated with the point p. In various embodiments, at operation 1012 in a spherical VR 360 camera system the two values include theta and phi and wherein theta is a camera angle within an xz-plane of the space associated with point p and wherein phi is tilt angle of the camera system with respect to y-axis of the space and associated with the point p. Operation 1012 can be implemented in any manner similar to that described and/or shown herein, but is not limited to such.

At operation 1014, based on the orientation, performing inverse mapping to obtain a pixel, s, on a capture plane of the camera corresponding to the point p and the lens point l. Note that operation 1014 can be implemented in a wide variety of ways. For example, operation 1014 can be implemented in any manner similar to that described and/or shown herein, but is not limited to such.

At operation 1016 of FIG. 10, using the pixel s, looking up a color value within the first data model corresponding to pixel s, and using this color value to compute a ray tracing value at the point p. Note that operation 1016 can be implemented in a wide variety of ways. For example, operation 1016 can be implemented in any manner similar to that described and/or shown herein, but is not limited to such.

At operation 1018, provided the point p lies within an object of the objects and is not occluded from a camera, performing operations 1020, 1022, and 1024. Note that operation 1018 can be implemented in a wide variety of ways. For example, operation 1018 can be implemented in any manner similar to that described and/or shown herein, but is not limited to such.

At operation 1020 of FIG. 10, based on the point p, performing inverse mapping to obtain an orientation in camera space corresponding to the point p and the lens point l, wherein the orientation is defined by two values. Note that operation 1020 can be implemented in a wide variety of ways. For example, in various embodiments, at operation 1020 in a cylindrical VR 360 camera system the two values include theta and h and wherein theta is a camera angle within an xz-plane of the space associated with point p and wherein h is a height in a y coordinate in the camera space associated with the point p. In various embodiments, at operation 1020 in a spherical VR 360 camera system the two values include theta and phi and wherein theta is a camera angle within an xz-plane of the space associated with point p and wherein phi is tilt angle of the camera system with respect to y-axis of the space and associated with the point p. Operation 1020 can be implemented in any manner similar to that described and/or shown herein, but is not limited to such.

At operation 1022, based on the orientation, performing inverse mapping to obtain a pixel, s, on a capture plane of the camera corresponding to the point p and the lens point l. Note that operation 1022 can be implemented in a wide variety of ways. For example, operation 1022 can be implemented in any manner similar to that described and/or shown herein, but is not limited to such.

At operation 1024 of FIG. 10, at the pixel s of the capture plane, rendering energy contribution from the point p. Note that operation 1024 can be implemented in a wide variety of ways. For example, operation 1024 can be implemented in any manner similar to that described and/or shown herein, but is not limited to such.

In various embodiments, it is noted that method 1000 can be performed by at least a processor and/or by at least a graphics processing unit, but is not limited to such.

Figure 11:
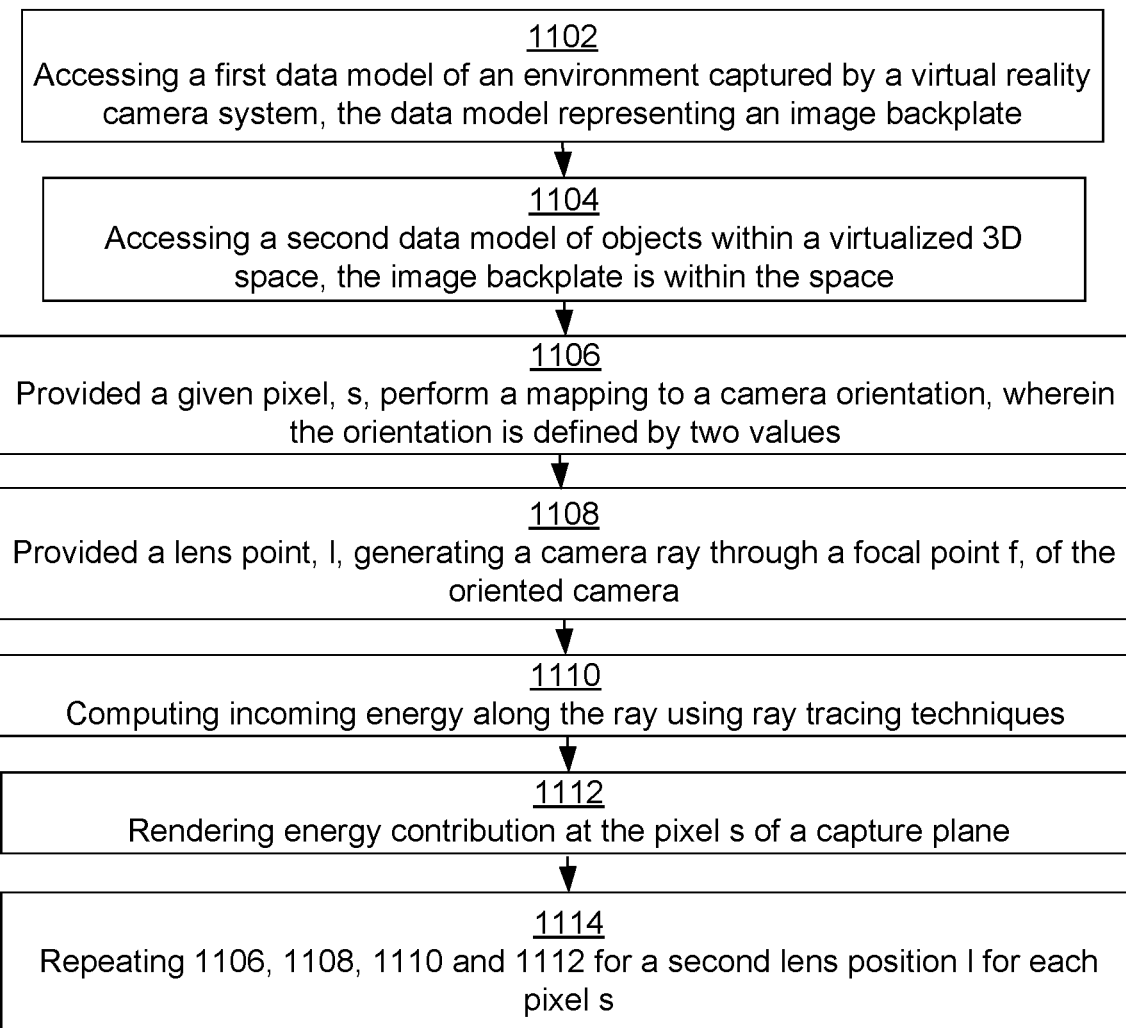
FIG. 11 is a flow diagram of a method for generating an image in accordance with various embodiments of the present disclosure.

FIG. 11 is a flow diagram of a method 1100 for generating an image in accordance with various embodiments of the present disclosure. Although specific operations are disclosed in FIG. 11, such operations are examples. The method 1100 may not include all of the operations illustrated by FIG. 11. Also, method 1100 may include various other operations and/or variations of the operations shown. Likewise, the sequence of the operations of flow diagram 1100 can be modified. It is appreciated that not all of the operations in flow diagram 1100 may be performed. In various embodiments, one or more of the operations of method 1100 can be controlled or managed by software, by firmware, by hardware or by any combination thereof, but is not limited to such. Method 1100 can include processes of embodiments of the present disclosure which can be controlled or managed by a processor(s) and/or electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium or memory.

At operation 1102, accessing a first data model of an environment captured by a virtual reality camera system, the data model representing an image backplate. Note that operation 1102 can be implemented in a wide variety of ways. For example, in various embodiments, at operation 1102 the virtual reality (VR) camera system is a cylindrical VR 360 camera system. In various embodiments, at operation 1102 the virtual reality camera system is a spherical VR 360 camera system. In various embodiments, at operation 1102 the first data model includes pixels that are referenced by the two values. Operation 1102 can be implemented in any manner similar to that described and/or shown herein, but is not limited to such.

At operation 1104 of FIG. 11, accessing a second data model of objects within a virtualized three dimensional (3D) space, wherein the image backplate is within the space. It is noted that operation 1104 can be implemented in a wide variety of ways. For example, operation 1104 can be implemented in any manner similar to that described and/or shown herein, but is not limited to such.

At operation 1106, provided a given pixel, s, perform a mapping to a camera orientation, wherein the orientation is defined by two values. Note that operation 1106 can be implemented in a wide variety of ways. For example, in various embodiments, at operation 1106, in a cylindrical VR 360 camera system the two values include theta and h and wherein theta is a camera angle within an xz-plane of the space associated with pixel s and wherein h is a height in a y coordinate in the camera space associated with the pixel s. In various embodiments, at operation 1106 in a spherical VR 360 camera system the two values include theta and phi and wherein theta is a camera angle within an xz-plane of the space associated with pixel s and wherein phi is tilt angle of the camera system with respect to y-axis of the space and associated with the pixel s. Operation 1106 can be implemented in any manner similar to that described and/or shown herein, but is not limited to such.

At operation 1108 of FIG. 11, provided a lens point, l, generating a camera ray through a focal point f, of the oriented camera. It is noted that operation 1108 can be implemented in a wide variety of ways. For example, operation 1108 can be implemented in any manner similar to that described and/or shown herein, but is not limited to such.

At operation 1110, Computing incoming energy along the ray using ray tracing techniques. Note that operation 1110 can be implemented in a wide variety of ways. For example, in various embodiments, at operation 1110 the ray tracing techniques are Monte Carlo ray tracing techniques, but are not limited to such. Operation 1110 can be implemented in any manner similar to that described and/or shown herein, but is not limited to such.

At operation 1112 of FIG. 11, rendering energy contribution at the pixel s of a capture plane. It is noted that operation 1112 can be implemented in a wide variety of ways. For example, operation 1112 can be implemented in any manner similar to that described and/or shown herein, but is not limited to such.

At operation 1114, repeating operations 1106, 1108, 1110 and 1112 for a second lens position l (or a plurality of lens positions l) for each pixel s. Note that operation 1114 can be implemented in a wide variety of ways. For example, operation 1114 can be implemented in any manner similar to that described and/or shown herein, but is not limited to such.

In various embodiments, it is noted that method 1100 can be performed by at least a processor and/or by at least a graphics processing unit, but is not limited to such.

Example Computing System

Figure 12:
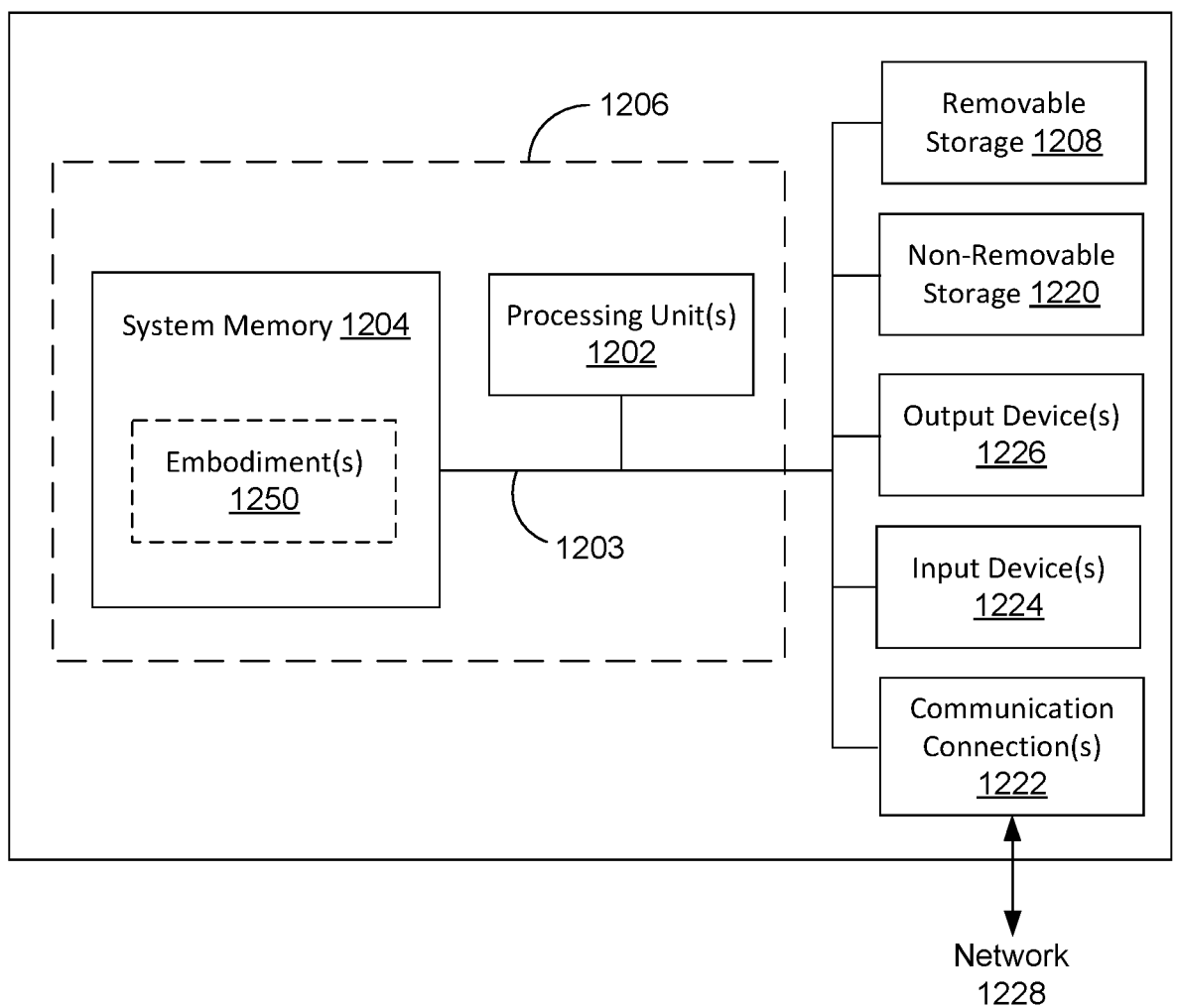
FIG. 12 is a block diagram of an example of a computing system upon which one or more various embodiments described herein may be implemented in accordance with various embodiments of the present disclosure.

FIG. 12 is a block diagram of an example of a computing system 1200 upon which one or more various embodiments described herein may be implemented in accordance with various embodiments of the present disclosure. In a basic configuration, the system 1200 can include at least one processing unit 1202 (e.g., graphics processing unit (GPU), central processing unit (CPU), processor, and the like) coupled to memory 1204. This basic configuration is illustrated in FIG. 12 by dashed line 1206. In various embodiments, the at least one processing unit 1202 can be coupled to the memory 1204 via an address/data bus 1203 (or other interface), but is not limited to such. The system 1200 may also have additional features and/or functionality. For example, the system 1200 may also include additional storage (e.g., removable and/or non-removable) including, but not limited to, magnetic or optical disks or tape. Such additional storage is illustrated in FIG. 12 by removable storage 1208 and non-removable storage 1220. The system 1200 may also contain communications connection(s) 1222 that allow the device to communicate with other devices, e.g., in a networked environment 1228 using logical connections to one or more remote computers. In various embodiments, the removable storage 1208, non-removable storage 1220, and communications connection(s) 1222 can be coupled to the address/data bus 1203 (or other interface).

The system 1200 may also includes input device(s) 1224 such as a keyboard, mouse, pen, voice input device, touch input device, etc. Output device(s) 1226 such as a display device, speakers, printer, etc., may also be included. In various embodiments, the input device(s) 1224 and the output device(s) 1226 can be coupled to the address/data bus 1203 (or other interface). It is noted that the address/data bus 1203 enables communication between those devices which are coupled to it.

In the example of FIG. 12, the memory 1204 can include computer-readable instructions, data structures, program modules, and the like associated with one or more various embodiments 1250 in accordance with the present disclosure. However, the embodiment(s) 1250 may instead reside in any one of the computer storage media used by the system 1200, or may be distributed over some combination of the computer storage media, or may be distributed over some combination of networked computers, but are not limited to such.

It is noted that the computing system 1200 may not include all of the elements illustrated by FIG. 12. In addition, the computing system 1200 can be implemented to include one or more elements not illustrated by FIG. 12. It is pointed out that the computing system 1200 can be utilized or implemented in any manner similar to that described and/or shown by the present disclosure, but is not limited to such.

The foregoing descriptions of various specific embodiments in accordance with the present disclosure have been presented for purposes of illustration and description. They are not intended to be exhaustive or to limit the present disclosure to the precise forms disclosed, and many modifications and variations are possible in light of the above teaching. The present disclosure is to be construed according to the Claims and their equivalents.

What is claimed is:

1. A computer-implemented method comprising:
ray tracing, within a virtualized three dimensional (3D) space, from a light source or camera to a point corresponding to an image backplate that is within the virtualized 3D space and is representative of a view of an environment captured by an omni-directional stereo camera;
simulating a finite aperture with respect to a virtual omni-directional stereo camera capturing a two dimensional (2D) projection of a 3D scene by determining a projection of a ray from the point through a focal point of the virtual omni-directional stereo camera to a lens point within the finite aperture of the virtual omni-directional stereo camera;
performing a first inverse mapping to obtain an orientation in camera space that corresponds to the point and the lens point by aligning the lens and the focal point with an omni-directional part of the projection;
based on the orientation, performing a second inverse mapping to obtain a pixel on a capture plane of the virtual omni-directional stereo camera, the pixel corresponding to the point and the lens point;
looking up a color value within the image backplate that corresponds to the pixel; and
computing a ray tracing value at the point using the color value.

2. The method of claim 1, wherein the omni-directional stereo camera comprises a cylindrical virtual reality camera and the projection comprises a cylindrical projection.

3. The method of claim 1, wherein the projection comprises a cylindrical projection and the orientation comprises a camera angle within an xz-plane of the virtualized 3D space associated with the point and a height in a y coordinate in the camera space associated with the point.

4. The method of claim 1, wherein the omni-directional stereo camera comprises a spherical virtual reality camera and the projection comprises a spherical projection.

5. The method of claim 1, wherein the projection comprises a spherical projection and the orientation comprises a camera angle within an xz-plane of the virtualized 3D space associated with the point and a tilt angle of the virtual omni-directional stereo camera with respect to a y-axis the virtualized 3D space associated with the point.

6. The method of claim 1, wherein the lens point is a randomly sampled point on the lens.

7. The method of claim 1, wherein the ray tracing comprises determining a path between the light source or camera to the point based on identifying interactions of rays within the virtualized 3D space.

8. The method of claim 1, further comprising rendering an image of the 2D projection of the 3D scene using the ray tracing value.

9. A system comprising:
one or more processing devices;
one or more memory devices communicatively coupled to the one or more processing devices storing programmed instructions thereon, which when executed by the one or more processing devices causes the one or more processing devices to perform a method comprising:
ray tracing, within a virtualized three dimensional (3D) space, from a light source or camera to a point corresponding to an image backplate that is within the virtualized 3D space and is representative of a stereoscopic panorama of an environment;
simulating a finite aperture with respect to a virtual panoramic stereo camera capturing a two dimensional (2D) projection of a 3D scene by determining a projection of a ray from the point through a focal point of the virtual panoramic stereo camera to a lens point within the finite aperture of the virtual panoramic stereo camera;
performing a first inverse mapping to obtain an orientation in camera space that corresponds to the point and the lens point by aligning the lens and the focal point with a stereo panoramic part of the projection;
based on the orientation, performing a second inverse mapping to obtain a pixel on a capture plane of the virtual panoramic stereo camera, the pixel corresponding to the point and the lens point;
looking up a color value within the image backplate that corresponds to the pixel; and
computing a ray tracing value at the point using the color value.

10. The system of claim 9, wherein the stereoscopic panorama is captured using an omni-directional stereo camera.

11. The system of claim 9, wherein the projection comprises a cylindrical projection and the orientation comprises a camera angle within an xz-plane of the virtualized 3D space associated with the point and a height in a y coordinate in the camera space associated with the point.

12. The system of claim 9, wherein the projection comprises a spherical projection and the orientation comprises a camera angle within an xz-plane of the virtualized 3D space associated with the point and a tilt angle of the virtual panoramic stereo camera with respect to a y-axis the virtualized 3D space associated with the point.

13. The system of claim 9, wherein the ray tracing comprises determining a path between the light source or camera to the point based on identifying interactions of rays within the virtualized 3D space.

14. A computer-implemented method comprising:

ray tracing, within a virtualized three dimensional (3D) space, from a light source or camera to a point corresponding to an object that is situated within the virtualized 3D space with an image backplate that is representative of a stereoscopic panorama of an environment;

simulating a finite aperture with respect to a virtual panoramic stereo camera capturing a two dimensional (2D) projection of a 3D scene that corresponds to the image backplate by determining a projection of a ray from the point through a focal point of the virtual panoramic stereo camera to a lens point within the finite aperture of the virtual panoramic stereo camera;

performing a first inverse mapping to obtain an orientation in camera space that corresponds to the point and the lens point by aligning the lens and the focal point with a stereo panoramic part of the projection;

based on the orientation, performing a second inverse mapping to obtain a pixel on a capture plane of the virtual panoramic stereo camera, the pixel corresponding to the point and the lens point; and rendering an energy contribution from the point at the pixel of the capture plane.

15. The method of claim 14, wherein the stereoscopic panorama is captured using an omni-directional stereo cylindrical camera.

16. The method of claim 14, wherein the projection comprises a cylindrical projection and the orientation comprises a camera angle within an xz-plane of the virtualized 3D space associated with the point and a height in a y coordinate in the camera space associated with the point.

17. The method of claim 14, wherein the stereoscopic panorama is captured using an omni-directional stereo spherical camera.

18. The method of claim 14, wherein the projection comprises a spherical projection and the orientation comprises a camera angle within an xz-plane of the virtualized 3D space associated with the point and a tilt angle of the virtual panoramic stereo camera with respect to a y-axis the virtualized 3D space associated with the point.

19. The method of claim 14, wherein the ray tracing comprises determining a path between the light source or camera to the point based on identifying interactions of rays within the virtualized 3D space.

20. The method of claim 14, wherein the rendering of the energy contribution is part of rendering an image of the 2D projection of the 3D scene.

* * * * *